(12) United States Patent
Lee et al.

(10) Patent No.: US 12,022,400 B2
(45) Date of Patent: Jun. 25, 2024

(54) METHOD AND APPARATUS FOR DETERMINING POWER RELATED TO SIDELINK TRANSMISSION IN NR V2X

(71) Applicant: LG ELECTRONICS INC., Seoul (KR)

(72) Inventors: Seungmin Lee, Seoul (KR); Daesung Hwang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/055,158

(22) Filed: Nov. 14, 2022

(65) Prior Publication Data

US 2023/0078557 A1 Mar. 16, 2023

Related U.S. Application Data

(63) Continuation of application No. PCT/KR2021/006126, filed on May 17, 2021.

(30) Foreign Application Priority Data

May 15, 2020 (KR) .......................... 10-2020-0058499

(51) Int. Cl.
*H04W 52/24* (2009.01)
*H04W 24/08* (2009.01)
(Continued)

(52) U.S. Cl.
CPC ........... *H04W 52/14* (2013.01); *H04W 24/08* (2013.01); *H04W 52/242* (2013.01); *H04W 56/001* (2013.01); *H04W 76/20* (2018.02)

(58) Field of Classification Search
CPC ................. H04W 52/14; H04W 24/08; H04W 52/242; H04W 56/001; H04W 76/20
See application file for complete search history.

(56) References Cited

U.S. PATENT DOCUMENTS

2017/0208494 A1* 7/2017 Moon .................... H04L 5/0048
2021/0037607 A1* 2/2021 Hamidi-Sepehr ....... H04L 5/001
(Continued)

FOREIGN PATENT DOCUMENTS

WO 2019-137344 7/2019

OTHER PUBLICATIONS

PCT International Application No. PCT/KR2021/006126, International Search Report dated Sep. 2, 2021, 4 pages.
(Continued)

*Primary Examiner* — Said M Elnoubi
(74) *Attorney, Agent, or Firm* — LEE, HONG, DEGERMAN, KANG & WAIMEY

(57) ABSTRACT

A method for performing wireless communication by a first apparatus is proposed. The method may comprise the steps of: determining power related to a sidelink (SL) transmission, on the basis of a downlink pathloss, wherein the SL transmission includes at least one from among a sidelink-synchronization signal/physical sidelink broadcast channel (S-SS/PSBCH) block transmission, a physical sidelink control channel (PSCCH) transmission, a physical sidelink shared channel (PSSCH) transmission, and a physical sidelink feedback channel (PSFCH) transmission; and performing the SL transmission on the basis of the power related to the SL transmission. For example, on the basis of being configured to monitor a downlink control information (DCI) format 0_0, the downlink pathloss may be determined on the basis of a first reference signal (RS) used for control of power related to a physical uplink shared channel (PUSCH) transmission to be scheduled by the DCI format 0_0. For example, on the basis of not being configured to monitor the DCI format 0_0, the downlink pathloss may be determined on the basis of a second RS related to a synchronization
(Continued)

signal block (SSB) for acquiring a master information block (MIB).

15 Claims, 21 Drawing Sheets

(51) Int. Cl.
*H04W 52/14* (2009.01)
*H04W 56/00* (2009.01)
*H04W 76/20* (2018.01)

(56) References Cited

U.S. PATENT DOCUMENTS

2022/0159583 A1* 5/2022 Wang .................... H04L 5/0051
2022/0394626 A1* 12/2022 Matsumura ........... H04W 72/04

OTHER PUBLICATIONS

Asustek, "Remaining issues on sidelink physical layer procedure on NR V2X," R1-2002473, 3GPP TSG RAN WG1 #100bis, e-Meeting, Apr. 2020, 15 pages.
3rd Generation Partnership Project, "Technical Specification Group Radio Access Network; NR; Physical layer procedures for control (Release 16)," 3GPP TS 38.213 V16.1.0, Mar. 2020, 158 pages.
LG Electronics, "Discussion on physical layer procedures for NR sidelink, " R1-1905443, 3GPP TSG RAN WG1 Meeting #96bis, Apr. 2019, 14 pages.
Zte et al., "Discussion on PHY procedures for NR V2X," R1-1902138, 3GPP TSG RAN WG1 Meeting #96, Mar. 2019, 10 pages.

* cited by examiner

FIG. 15 perform SL communication
with first device based on          — S1510
power related to SL communication

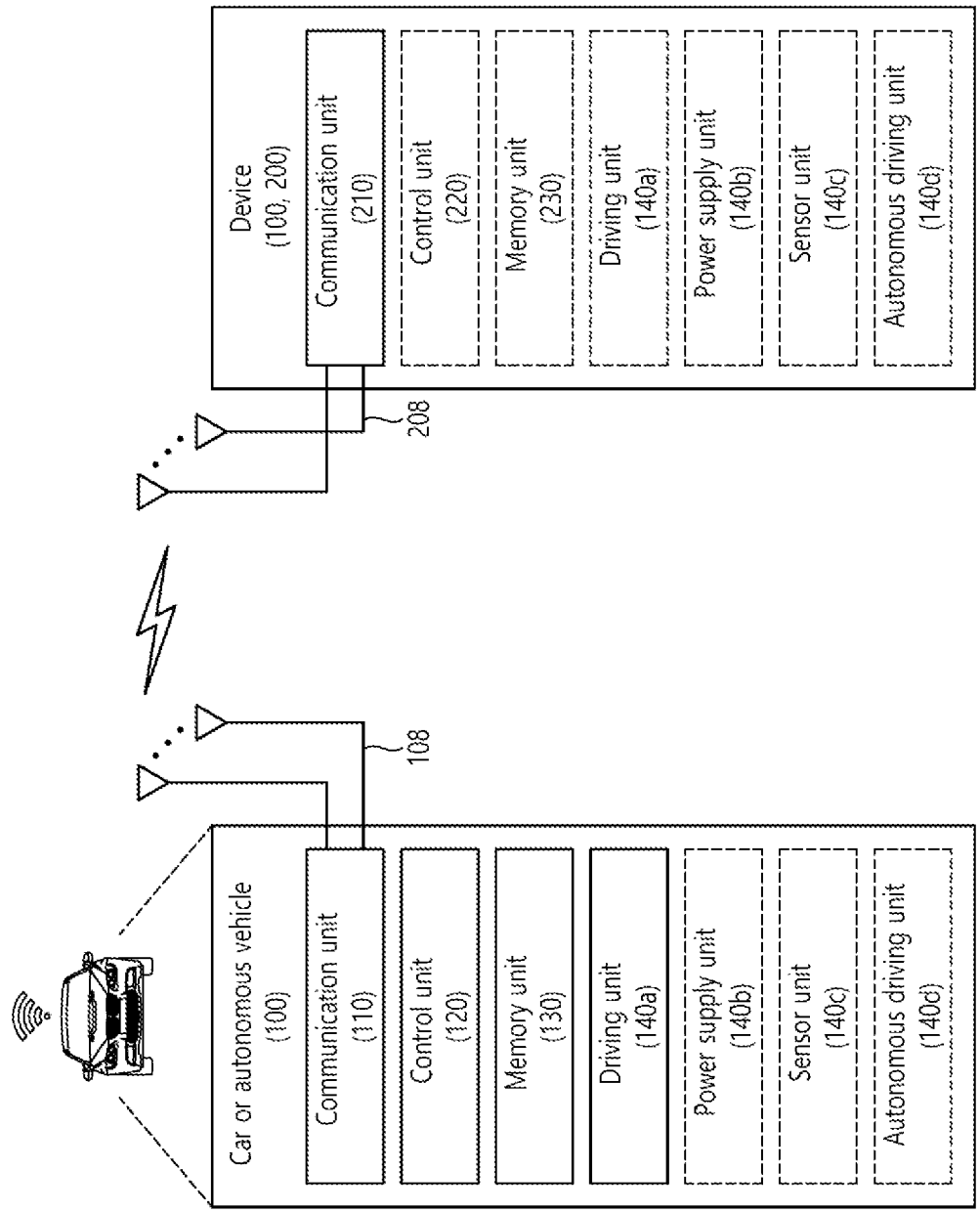

METHOD AND APPARATUS FOR DETERMINING POWER RELATED TO SIDELINK TRANSMISSION IN NR V2X

CROSS-REFERENCE TO RELATED APPLICATIONS

This application is a continuation of International Application No. PCT/KR2021/006126, filed on May 17, 2021, which claims the benefit of earlier filing date and right of priority to Korean Application No. 10-2020-0058499, filed on May 15, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in NR sidelink communication, if a UE is within a coverage of a base station, the UE may determine sidelink (SL) transmit power based on a downlink (DL) pathloss (hereinafter, DL PL) in order to reduce an interference level on uplink (UL) communication. Herein, for example, there may be a problem as to which reference signal(RS)/signal the UE should use to derive the DL PL.

In one embodiment, provided is a method for performing wireless communication by a first device. The method may comprise: determining power related to sidelink (SL) transmission based on a downlink pathloss, wherein the SL transmission includes at least one of sidelink-synchronization signal/physical sidelink broadcast channel (S-SS/PSBCH) block transmission, physical sidelink control channel (PSCCH) transmission, physical sidelink shared channel (PSSCH) transmission, or physical sidelink feedback channel (PSFCH) transmission; and performing the SL transmission based on the power related to the SL transmission. For example, based on being configured to monitor a downlink control information (DCI) format 0_0, the downlink pathloss may be determined based on a first reference signal (RS) used for power control related to physical uplink shared channel (PUSCH) transmission scheduled by the DCI format 0_0. For example, based on not being configured to monitor the DCI format 0_0, the downlink pathloss may be determined based on a second RS related to a synchronization signal block (SSB) for obtaining a master information block (MIB).

In one embodiment, provided is a first device adapted to perform wireless communication. The first device may comprise: one or more memories storing instructions; one or more transceivers; and one or more processors connected to the one or more memories and the one or more transceivers. The one or more processors may execute the instructions to: determine power related to SL transmission based on a downlink pathloss, wherein the SL transmission includes at least one of S-SS/PSBCH block transmission, PSCCH transmission, PSSCH transmission, or PSFCH transmission; and perform the SL transmission based on the power related to the SL transmission. For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB.

The UE can efficiently perform SL communication.

BRIEF DESCRIPTION OF THE DRAWINGS

FIG. 15 shows a method for a second device to perform sidelink communication with a first device, based on an embodiment of the present disclosure.

FIG. 21 shows a vehicle or an autonomous vehicle, based on an embodiment of the present disclosure.

DETAILED DESCRIPTION

Figure 1:
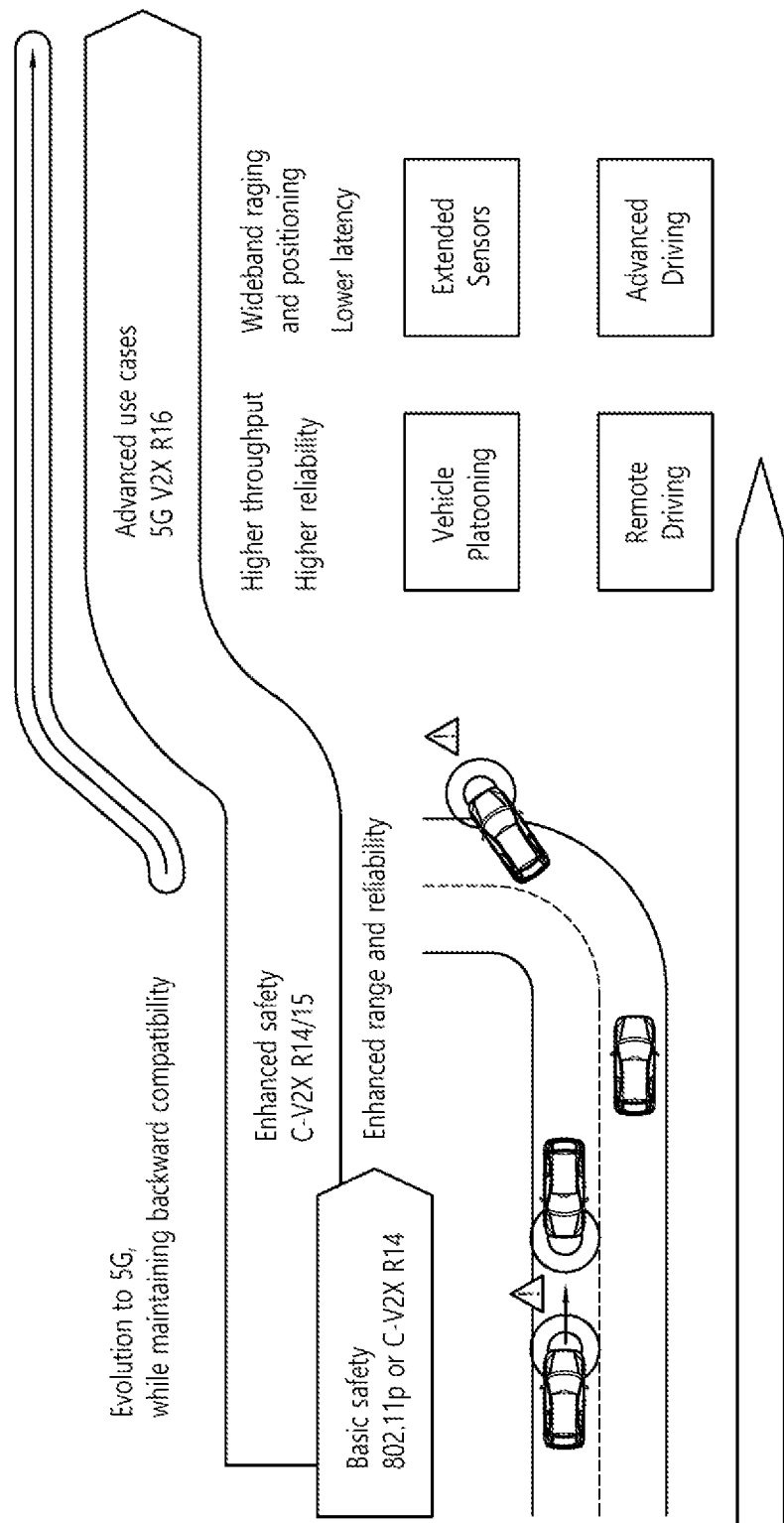
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
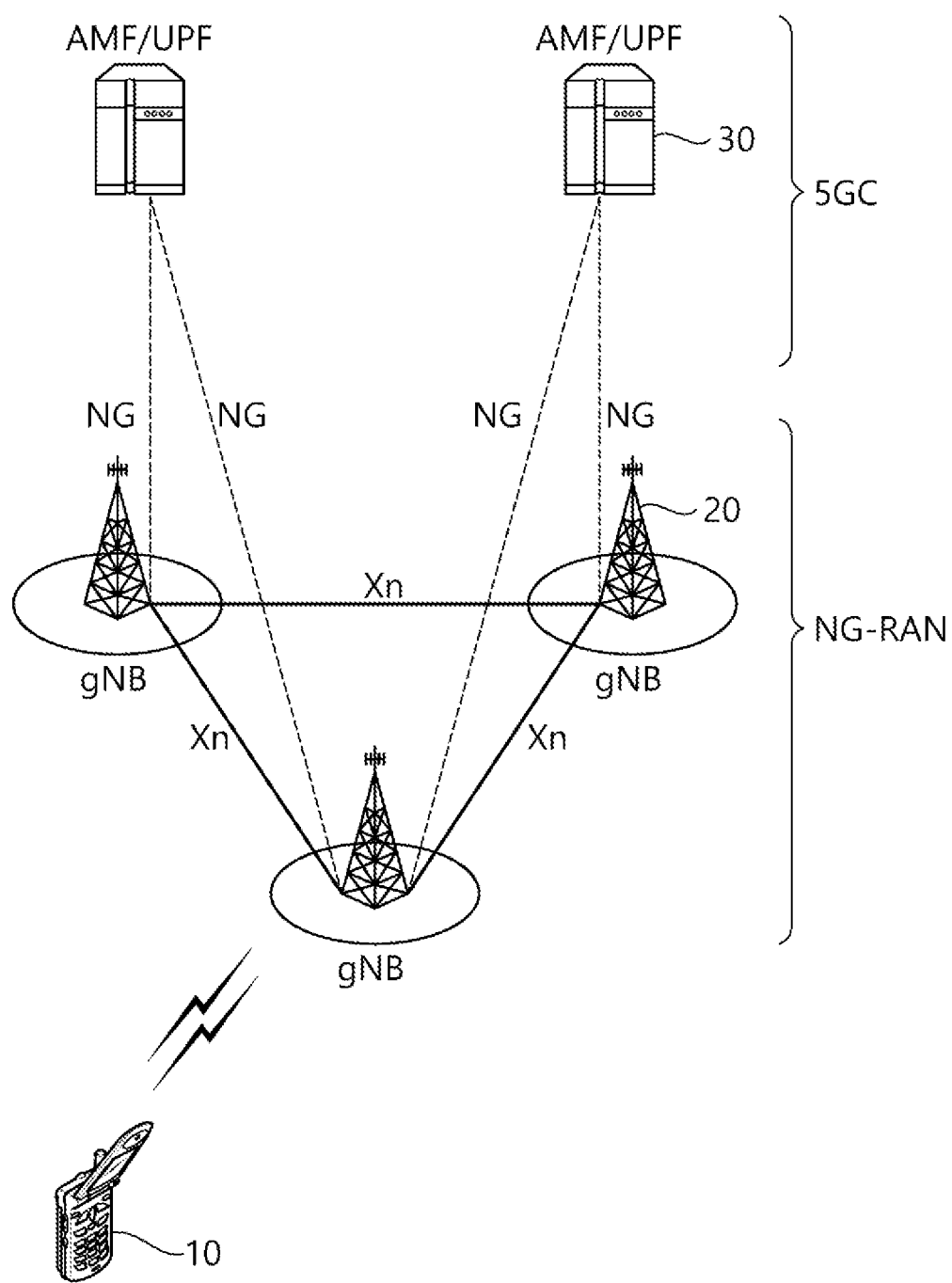
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
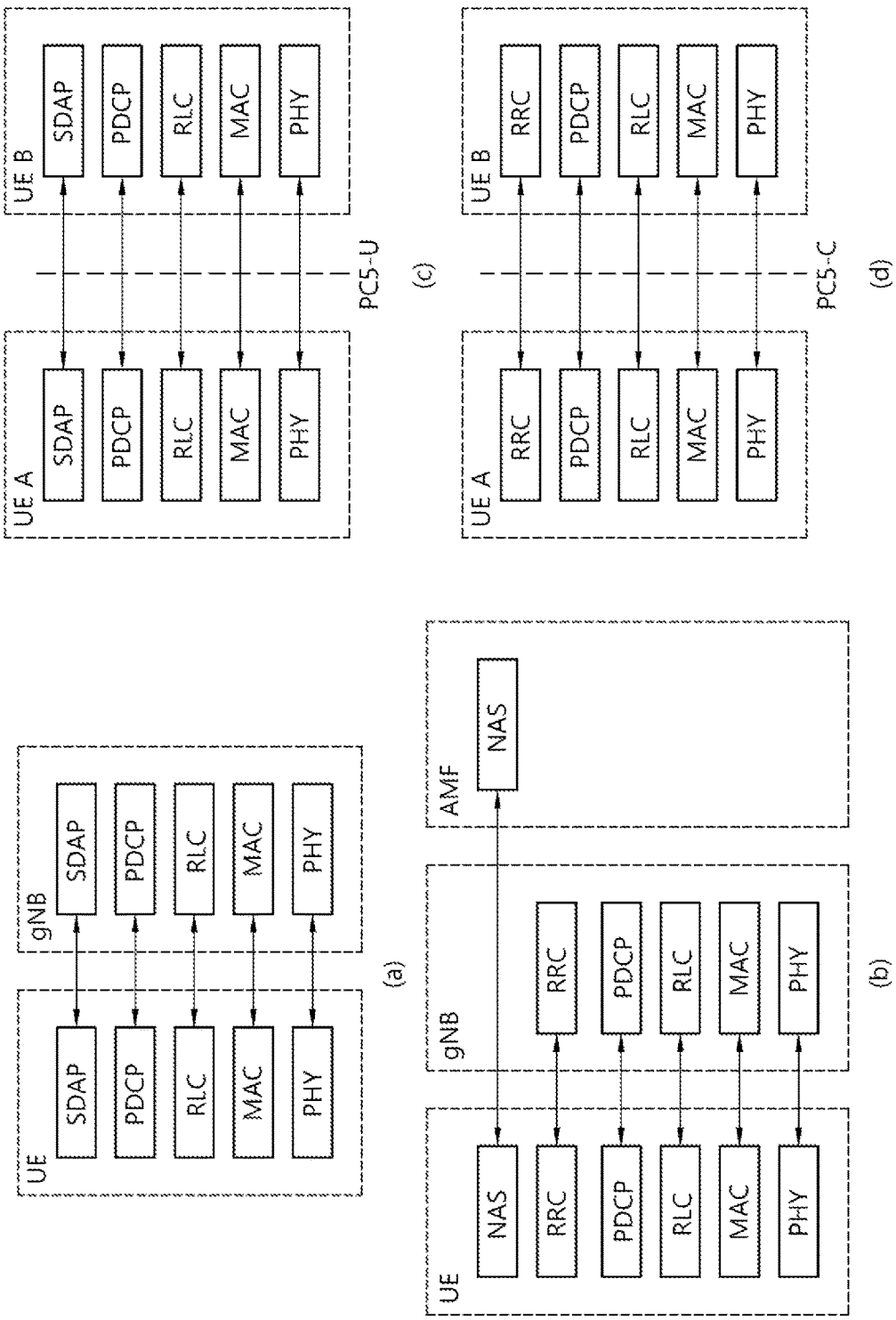
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
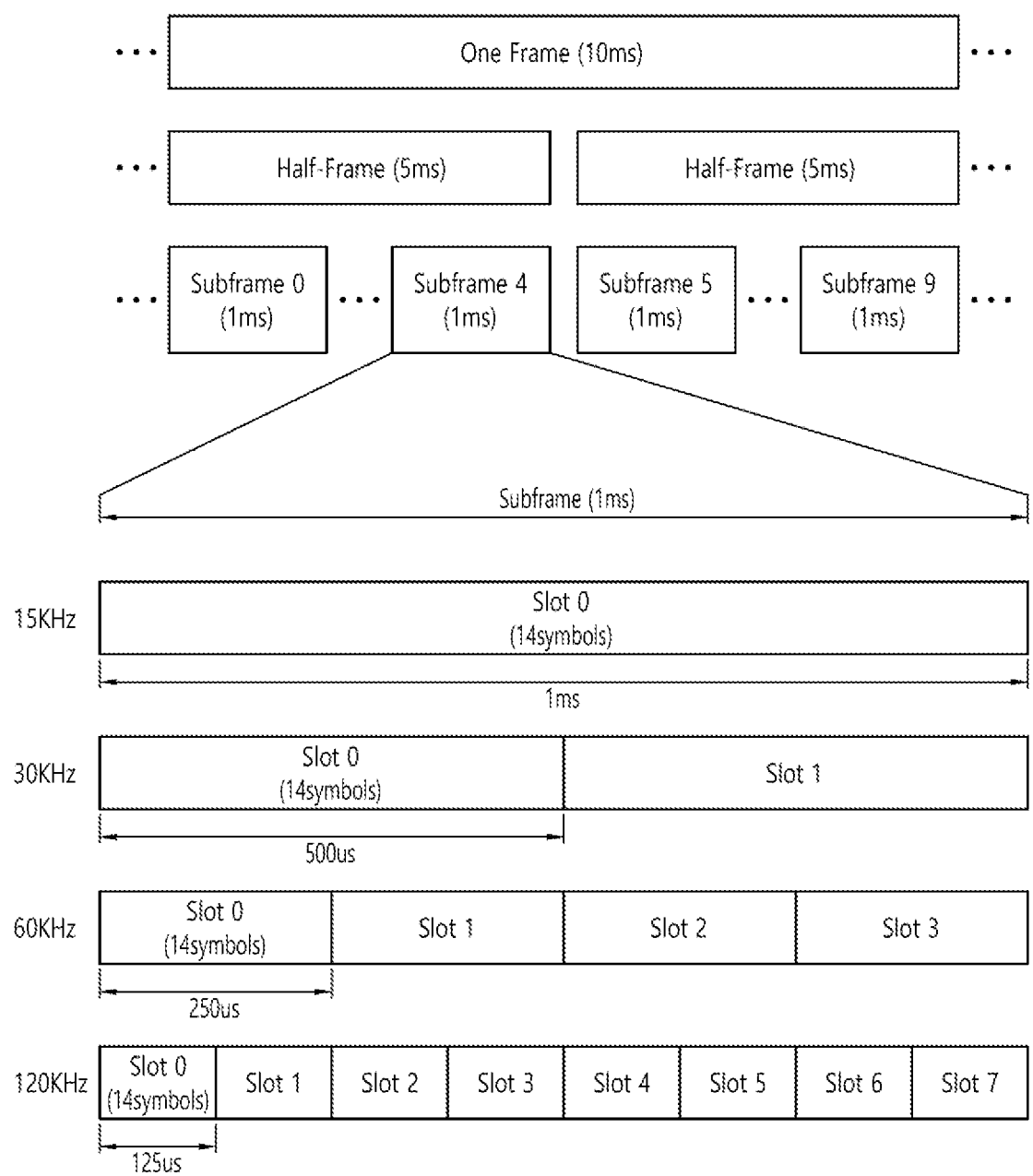
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^U$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^U$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
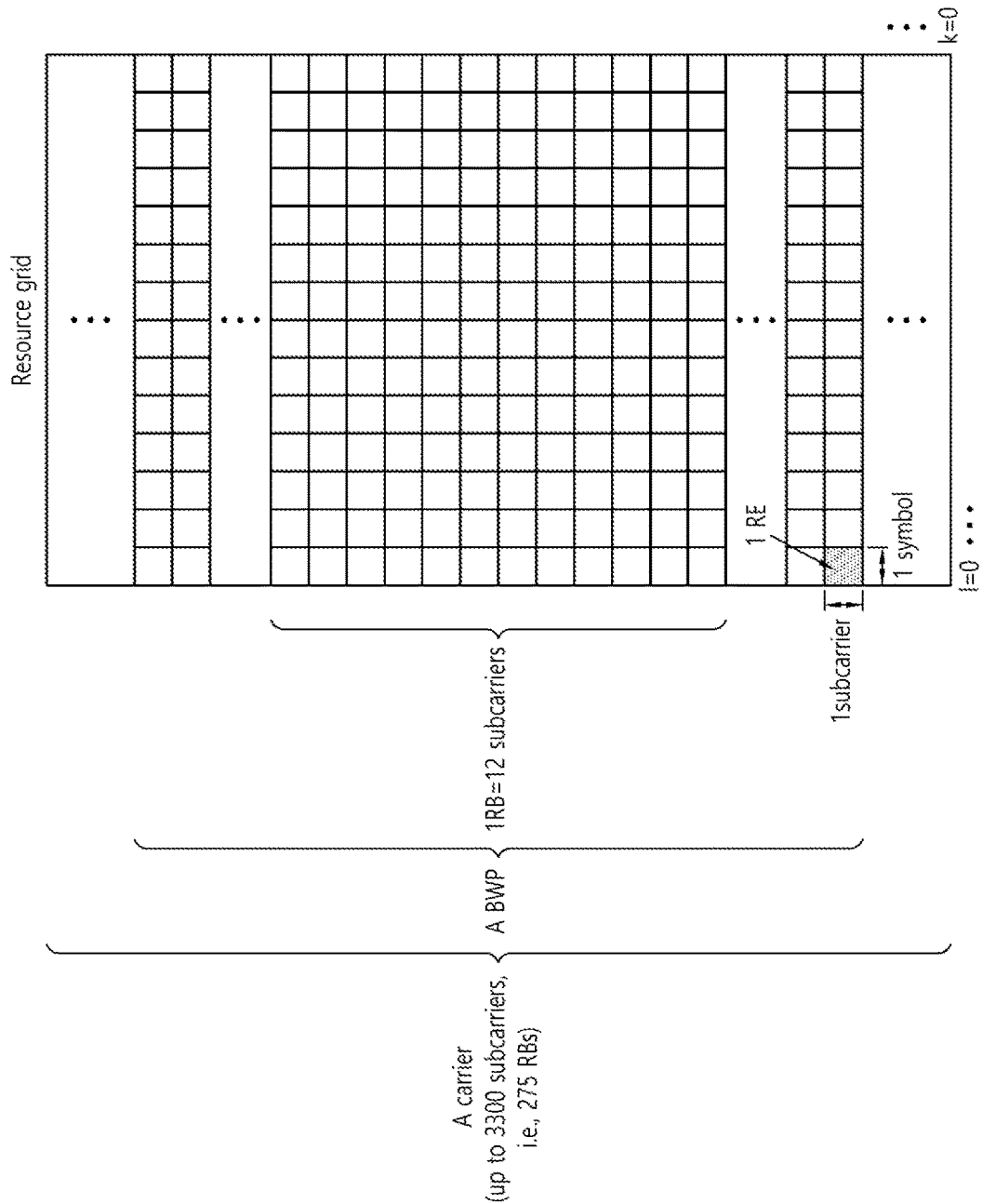
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
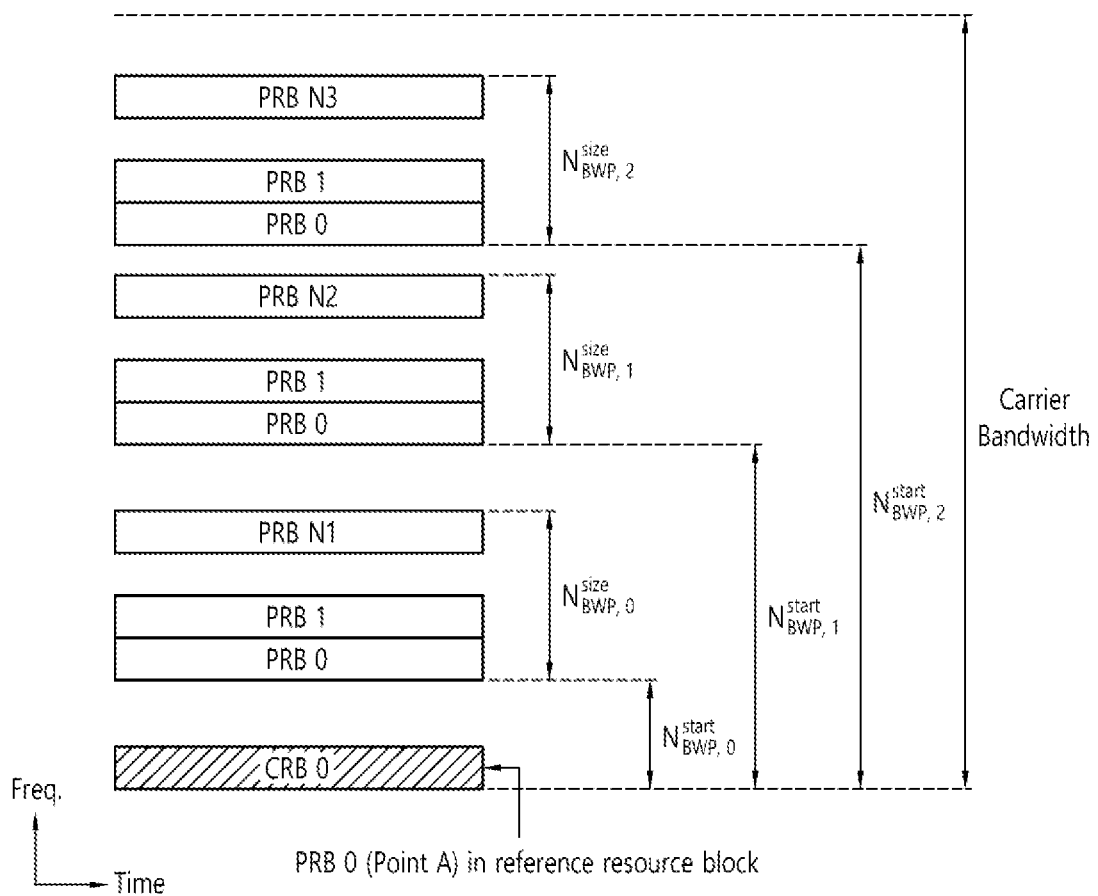
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
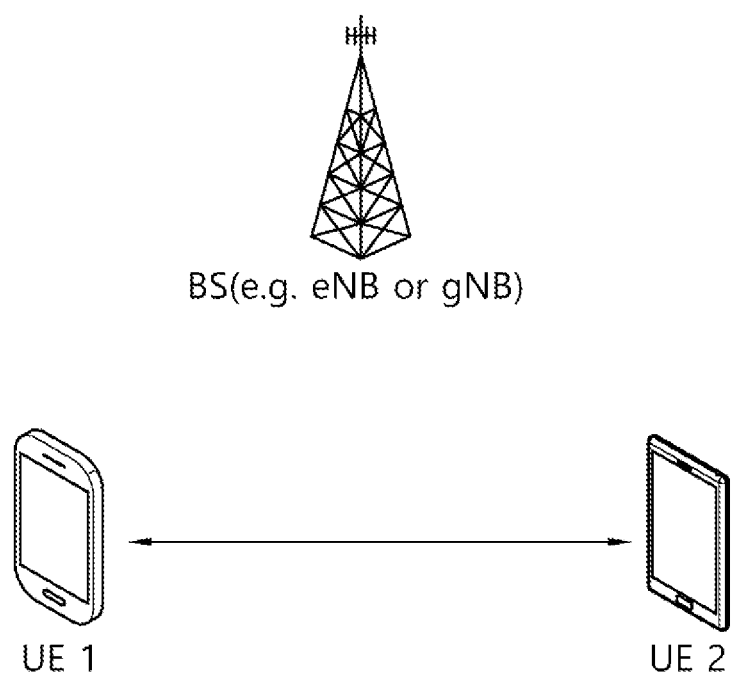
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
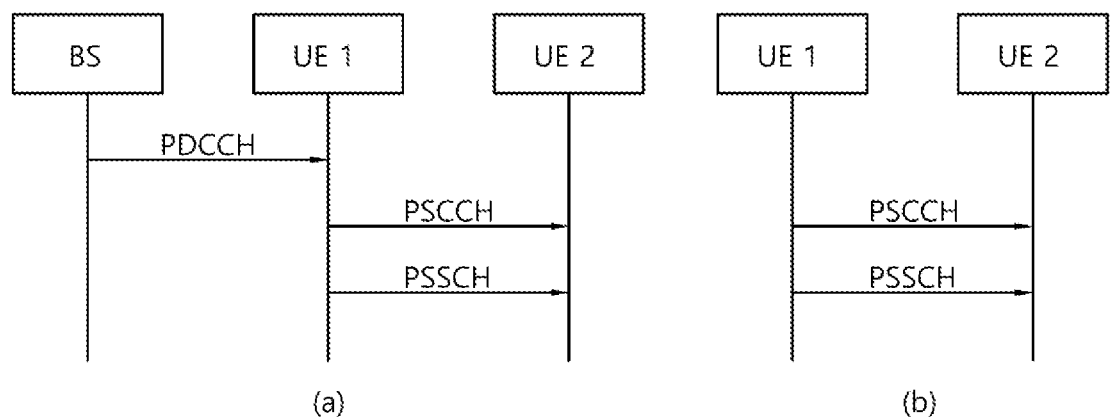
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
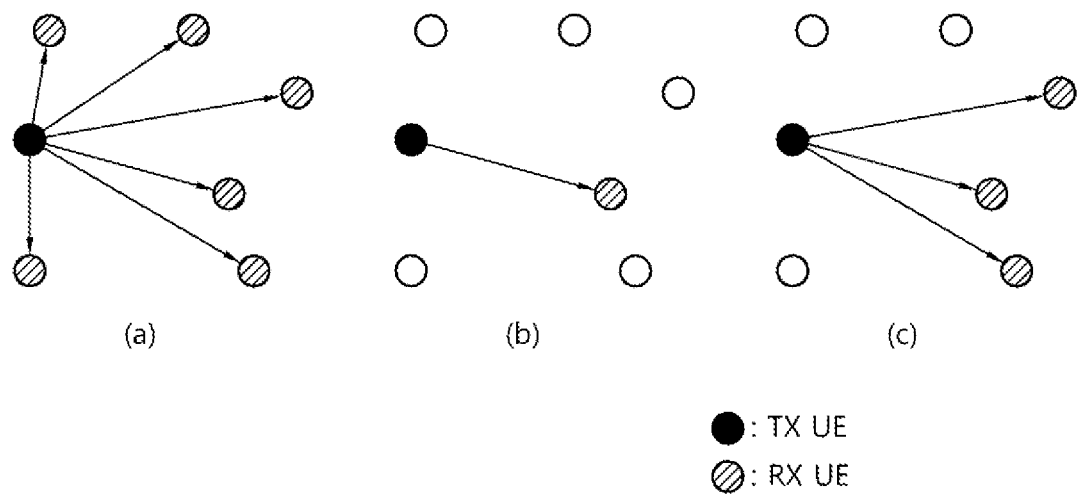
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission.

Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) reference signal received power (RSRP) (and/or SL (L1) reference signal received quality (RSRQ) and/or SL (L1) reference signal strength indicator (RSSI)) report request indicator SL CSI transmission indicator (or SL (L1) RSRP (and/or SL (L1) RSRQ and/or SL (L1) RSSI) information transmission indicator) (on a PSSCH)

Modulation and Coding Scheme (MCS) information

TX power information

L1 destination ID information and/or L1 source ID information

SL HARQ process ID information

New Data Indicator (NDI) information

Redundancy Version (RV) information (Transmission traffic/packet related) QoS information (e.g., priority information)

SL CSI-RS transmission indicator or information on the number of antenna ports for (transmitting) SL CSI-RS TX UE location information or location (or distance range) information of the target RX UE (for which SL HARQ feedback is requested)

Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI.

Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.
SL HARQ feedback, SL CSI, SL (L1) RSRP Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

Figure 10:
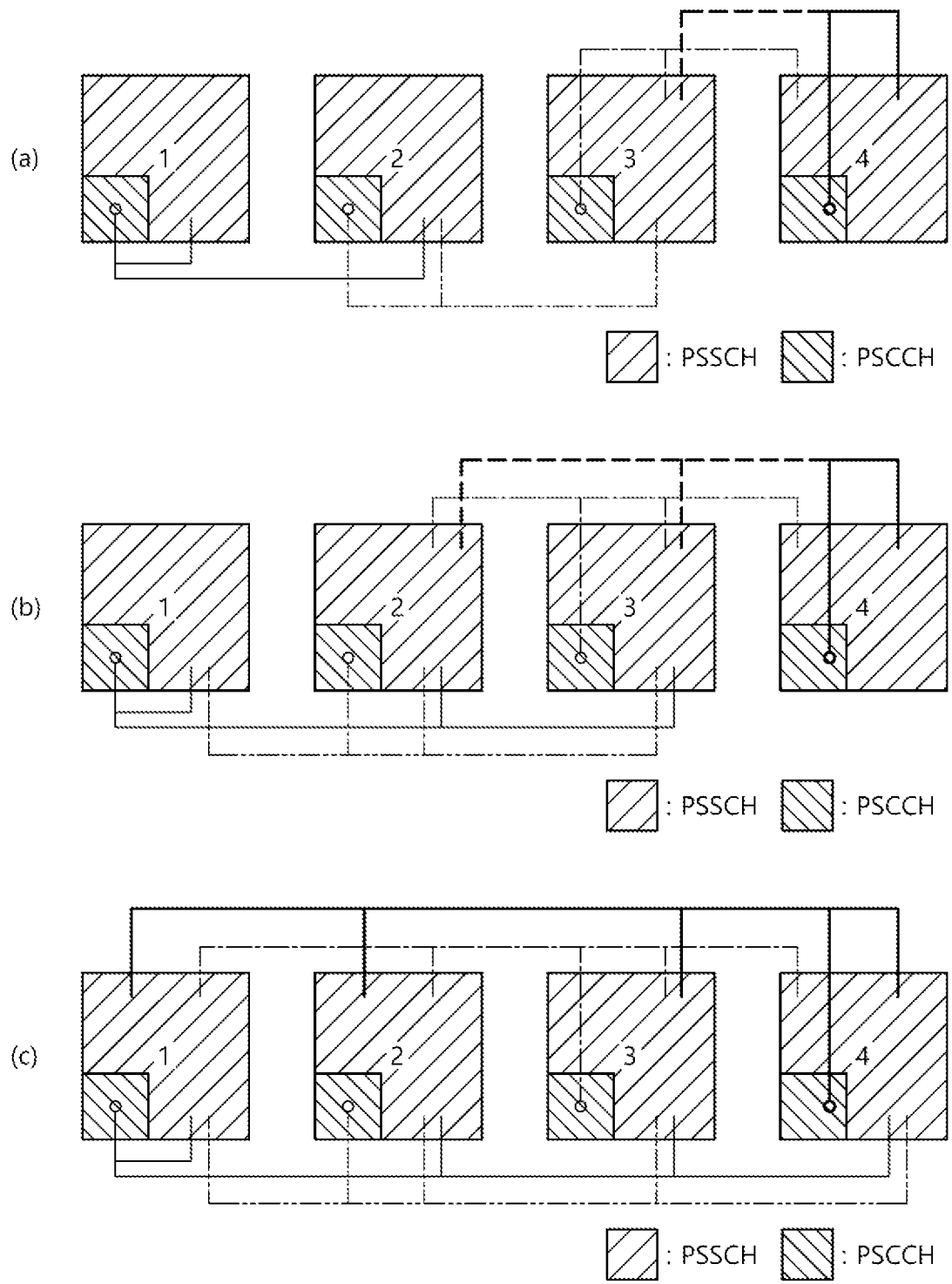
FIG. 10 shows a method in which a UE that has reserved transmission resource(s) informs another UE of the transmission resource(s), based on an embodiment of the present disclosure.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Meanwhile, in the next-generation communication system, the base station may transmit information related to sidelink transmission to the UE through a Uu link or interface. In this case, the UE may operate in an NR sidelink resource allocation mode 1. When the UE operates in the NR sidelink resource allocation mode 1, the base station may transmit information related to NR sidelink transmission to the UE in the form of downlink control information (DCI) through a physical downlink control channel (PDCCH).

The PDCCH may carry downlink control information, and a quadrature phase shift keying (QPSK) modulation scheme may be applied. One PDCCH may consist of 1, 2, 4, 8, and 16 control channel elements (CCEs) according to an aggregation level (AL). One CCE may consist of 6 resource element groups (REGs). One REG may be defined as one OFDM symbol and one resource block (RB) or physical resource block (PRB). The PDCCH may be transmitted through a control resource set (hereinafter, CORESET). The CORESET may be defined as an REG set having a given numerology (e.g., subcarrier spacing, cyclic prefix length, etc.). For example, a plurality of CORESETs for one UE may overlap in a time/frequency domain. The CORESET may be configured through system information (e.g., master information block (MIB)) or UE-specific higher layer (e.g., radio resource control (RRC) layer) signaling. Specifically, for example, the number of RBs and the number of symbols (maximum 3) constituting the CORESET may be configured by higher layer signaling. The number of CORESETs that can be allocated to the UE may be limited by considering complexity. For example, up to 3 CORESETs may be configured for the UE.

The UE may obtain DCI transmitted through a PDCCH by performing decoding (e.g., blind decoding) for a set of PDCCH candidates received through the Uu link or interface. The set of PDCCH candidates decoded by the UE may be defined as a PDCCH search space set. The search space set may be a common search space or a UE-specific search space. The UE may obtain DCI by monitoring a PDCCH candidate in one or more search space sets configured by MIB or higher layer signaling. Each CORESET configuration may be associated with one or more search space sets, and each search space set may be associated with one CORESET configuration. For example, DCI may have a plurality of formats. Table 5 below shows DCI formats.

TABLE 5

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

Referring to Table 5, for example, the DCI format 0_0 may be a DCI format for scheduling a PUSCH by the base station. For example, the DCI format 0_0 may be non-fallback DCI. For example, the non-fallback DCI may have a fixed DCI size. For example, the DCI format 0_1 may be a DCI format for the base station to schedule one or more PUSCHs or to indicate downlink feedback information (CG-DFI) for a configured grant PUSCH. For example, the DCI format 0_2 may be a DCI format for scheduling a PUSCH by the base station. For example, the DCI format 0_1 and the DCI format 0_2 may be fallback DCI. For example, the fallback DCI may have a variable DCI size. For example, the fallback DCI may not include some fields according to a configured function. For example, the DCI format 3_0 may be DCI for scheduling NR sidelink by the base station. For example, the DCI format 3_1 may be DCI for scheduling LTE sidelink by the base station. Meanwhile, in sidelink communication, when the transmitting UE is located within a coverage of the base station (i.e., in-coverage UE) and the transmitting UE needs to perform power control related to downlink (DL) pathloss (PL)-based SL transmission according to a configuration of the base station, it is necessary to clearly define which reference signal/signal signaled from the base station to use to measure a DL PL value.

For example, when the transmitting UE measures a DL PL used for power control related to SL transmission, if the transmitting UE monitors DCI 0_0, a reference signal (RS) used for power control of a PUSCH scheduled by DCI 0_0 may be used, otherwise, an RS related to an SS/PBCH block used for MIB acquisition may be used.

Therefore, based on a state/condition of the in-coverage UE, a reference signal used for DL PL measurement used for power control of SL transmission may be clearly defined/distinguished. For this reason, the base station can perform necessary UL quality control by effectively predicting an interference that in-coverage UE's SL transmission has on UL reception.

Based on an embodiment of the present disclosure, if the UE is in a coverage of the base station, the UE may determine/control sidelink (SL) transmit power based on downlink (DL) pathloss (PL). For example, the in-coverage UE may determine/control SL transmission power based on a DL PL in order to reduce an interference level on UL communication. Herein, for example, the DL PL may be derived based on a reference signal (RS) determined according to various embodiments of the present disclosure. For example, the UE may derive the DL PL based on the RS determined according to various embodiments of the present disclosure. For example, the DL PL may be considered as a DL PL used for determining transmit power related to a DCI format/type-based UU channel/signal (e.g., PUSCH) according to various embodiments of the present disclosure. For example, the DL PL may be considered as a DL PL measured by an RS and/or a sequence (e.g., a sync sequence, PBCH DMRS) related to a UU channel/signal according to various embodiments of the present disclosure. For example, hereinafter, for convenience of description, the DL PL for the above purpose may be referred to as "DLPL_SLPW".

In addition, for example, whether various embodiments of the present disclosure are applied and/or parameters related to various embodiments of the present disclosure may be configured specifically or differently based on at least one of a priority/type of a service, a QoS requirement of a service (e.g., latency, reliability), congestion level of a resource pool (e.g., CBR), a resource pool, a cast type (e.g., unicast, groupcast, broadcast), a HARQ feedback scheme (e.g., ACK/NACK feedback, feedback transmitting only NACK), a SL operation mode (e.g., mode 1, mode 2), a MAC PDU for which HARQ feedback is enabled, a TB for which HARQ feedback is enabled, a MAC PDU for which HARQ feedback is disabled, a TB for which HARQ feedback is disabled, the number of SL sessions operated or can be operated by the UE, the number of PSFCHs that can be simultaneously transmitted by the UE, the number of PSFCHs that can be simultaneously received/processed by the UE (e.g., the capability of the UE), a PSFCH resource period related to a resource pool, the number of SL HARQ feedback bits/amount of information transmitted through a PUCCH, the number of PSFCH slots associated with a PUCCH, the number of PSSCH slots associated with the last PSFCH slot associated with a PUCCH, the number of PSFCHs required to be received to configure PUCCH information, the number of PSFCHs required to be simultaneously received on the last PSFCH slot associated with a PUCCH to configure PUCCH information, a value of a counter sidelink assignment index field in DG DCI, the number of symbols related to a sidelink slot on the last PSFCH slot associated with a PUCCH in a resource pool, the number of symbols related to a PSSCH, the number of PSFCH symbols in a sidelink slot, the number/position of PSFCH symbols on the last PSFCH slot associated with a PUCCH, a time domain pattern of PSSCH DMRS, the number of PSSCH DMRS symbols, position/index of the last DMRS symbol in a sidelink slot among PSSCH DMRS symbols, whether SL CSI-RS is configured, whether PT-RS is configured, a synchronization difference between Uu communication and SL communication, whether a synchronization difference between Uu communication and SL communication exceeds a pre-configured threshold, a type of HARQ codebook related to a PUCCH (e.g., semi-static codebook, dynamic codebook), the number of PUSCH symbols to which a PUCCH is piggybacked, the number of PUSCH symbols to which a PUCCH related to a PSFCH is piggybacked, the number/position of DMRS symbols on a PUSCH, a mode 1 dynamic grant, a mode 1 configured grant, a SL numerology (e.g., sub-carrier spacing, CP length/type), a SL numerology related to a PSFCH, a UL numerology, a UL numerology related to a PUCCH, a minimum value between a SL numerology and a UL numerology, a combination of a SL numerology and a UL numerology, and/or whether the UE is in an RRC connection state or an RRC idle state with the base station/network. Herein, for example, the number of SL sessions may be one of the maximum number of SL sessions, the minimum number of SL sessions, or the average number of SL sessions. For example, the number of PSFCHs may be one of the maximum number of PSFCHs, the minimum number of PSFCHs, or the average number of PSFCHs. For example, the number of SL HARQ feedback bits may be one of the maximum number of SL HARQ feedback bits, the minimum number of SL HARQ feedback bits, or the average number of SL HARQ feedback bits. For example, the number of PSFCH slots may be one of the maximum number of PSFCH slots, the minimum number of PSFCH slots, or the average number of PSFCH slots. For example, the number of PSSCH slots may be one of the maximum number of PSSCH slots, the minimum number of PSSCH slots, or the average number of PSSCH slots. For example, the number of PSSCH slots associated with the last PSFCH slot associated with the PUCCH may be the number of feedback bundling PSSCH slots associated with the last PSFCH slot associated with a specific PUCCH. For example, the number of symbols may be one of the maximum number of symbols, the minimum number of symbols, or the average number of symbols. For example, the time domain pattern of the PSSCH DMRS may be a time domain pattern of the PSSCH DMRS related to the resource pool, and may be pre-configured. For example, the number of PSSCH DMRS symbols may be the number of symbols for a time domain DMRS pattern of a selectable PSSCH. For example, the synchronization difference between UU communication and SL communication may include at least one of a boundary difference between subframes, a boundary difference between slots, a boundary difference between symbols, or a difference between the starting points of SFN 0 and DFN 0.

Based on an embodiment of the present disclosure, the condition A may include at least one of a case in which the UE does not receive RS information related to DLPL_SLPW from the base station, a case in which the UE does not receive RS information related to a pre-configured UU channel/signal (e.g., PUSCH) referenced for deriving DLPL_SLPW, a case in which the UE is before receiving a dedicated higher layer parameter from the base station, or a case in which the UE is in an RRC_IDLE state. For example, if the UE corresponds to the condition A, the UE may consider a DL PL measured based on an RS related to a Uu SSB used for deriving MIB information as DLPL_SLPW. Various embodiments of the present disclosure related thereto will be described in detail.

For example, if the UE does not receive RS information (e.g., PUSCH-PATHLOSSREFERENCERS) related to DLPL_SLPW from the base station, the UE may consider a DL PL measured based on an RS (e.g., PBCH DMRS) related to a Uu SSB used for deriving MIB information as DLPL_SLPW. For example, if the UE does not receive RS information related to DLPL_SLPW from the base station, the UE may consider a DL PL measured based on an RS and/or a synchronization sequence (e.g., SSS) related to a Uu SSB used for deriving MIB information and/or SIB information related to SL communication as DLPL_SLPW. For example, if the UE does not receive RS information related to DLPL_SLPW from the base station, the UE may consider a DL PL measured based on an RS and/or a synchronization sequence (e.g., SSS) related to a Uu SSB used for deriving MIB information and/or SIB information related to Uu communication as DLPL_SLPW. For example, if the UE does not receive RS information related to DLPL_SLPW from the base station, and if there are DL PLs or RSRPs measured based on RSs and/or synchronization sequences associated with a plurality of Uu SSBs, the UE may consider a DL PL value related to a maximum value among the plurality of values as DLPL_SLPW. For example, if the UE does not receive RS information related to DLPL_SLPW from the base station, and if there are DL PLs or RSRPs measured based on RSs and/or synchronization sequences associated with a plurality of Uu SSBs, the UE may consider a DL PL value related to a minimum value among the plurality of values as DLPL_SLPW. For example, if the UE does not receive RS information related to DLPL_SLPW from the base station, and if there are DL PLs or RSRPs measured based on RSs and/or synchronization sequences associated with a plurality of Uu SSBs, the UE may consider a DL PL value related to an average value of the plurality of values as DLPL_SLPW. For example, the average value may be a weight average value. For example, the UE may be a UE within a coverage of the base station.

Or, for example, if the UE does not receive RS information (e.g., PUSCH-PATHLOSSREFERENCERS) related to a pre-configured UU channel/signal (e.g., PUSCH) referenced for deriving DLPL_SLPW, the UE may consider a DL PL measured based on an RS (e.g., PBCH DMRS) related to a Uu SSB used for deriving MIB information as DLPL_SLPW. Herein, for example, the RS information may be information for deriving a DL PL. For example, if the UE does not receive RS information related to a pre-configured UU channel/signal (e.g., PUSCH) referenced for deriving DLPL_SLPW, the UE may consider a DL PL measured based on an RS and/or a synchronization sequence (e.g., SSS) related to a Uu SSB used for deriving MIB information and/or SIB information related to SL communication as DLPL_SLPW. For example, if the UE does not receive RS information related to a pre-configured UU channel/signal (e.g., PUSCH) referenced for deriving DLPL_SLPW, the UE may consider a DL PL measured based on an RS and/or a synchronization sequence (e.g., SSS) related to a Uu SSB used for deriving MIB information and/or SIB information related to Uu communication as DLPL_SLPW. For example, if the UE does not receive RS information related to a pre-configured UU channel/signal (e.g., PUSCH) referenced for deriving DLPL_SLPW, and if there are DL PLs or RSRPs measured based on RSs and/or synchronization sequences associated with a plurality of Uu SSBs, the UE may consider a DL PL value related to a maximum value among the plurality of values as DLPL_SLPW. For example, if the UE does not receive RS information related to a pre-configured UU channel/signal (e.g., PUSCH) referenced for deriving DLPL_SLPW, and if there are DL PLs or RSRPs measured based on RSs and/or synchronization sequences associated with a plurality of Uu SSBs, the UE may consider a DL PL value related to a minimum value among the plurality of values as DLPL_SLPW. For example, if the UE does not receive RS information related to a pre-configured UU channel/signal (e.g., PUSCH) referenced for deriving DLPL_SLPW, and if there are DL PLs or RSRPs measured based on RSs and/or synchronization sequences associated with a plurality of Uu SSBs, the UE may consider a DL PL value related to an average value of the plurality of values as DLPL_SLPW. For example, the average value may be a weight average value. For example, the UE may be a UE within a coverage of the base station.

Or, for example, if the UE is before receiving a dedicated higher layer (e.g., RRC) parameter from the base station, the UE may consider a DL PL measured based on an RS (e.g., PBCH DMRS) related to a Uu SSB used for deriving MIB information as DLPL_SLPW. For example, if the UE is before receiving a dedicated higher layer parameter from the base station, the UE may consider a DL PL measured based on an RS and/or a synchronization sequence (e.g., SSS) related to a Uu SSB used for deriving MIB information and/or SIB information related to SL communication as DLPL_SLPW. For example, if the UE is before receiving a dedicated higher layer parameter from the base station, the UE may consider a DL PL measured based on an RS and/or a synchronization sequence (e.g., SSS) related to a Uu SSB used for deriving MIB information and/or SIB information related to Uu communication as DLPL_SLPW. For example, if the UE is before receiving a dedicated higher layer parameter from the base station, and if there are DL PLs or RSRPs measured based on RSs and/or synchronization sequences associated with a plurality of Uu SSBs, the UE may consider a DL PL value related to a maximum value among the plurality of values as DLPL_SLPW. For example, if the UE is before receiving a dedicated higher layer parameter from the base station, and if there are DL PLs or RSRPs measured based on RSs and/or synchronization sequences associated with a plurality of Uu SSBs, the UE may consider a DL PL value related to a minimum value among the plurality of values as DLPL_SLPW. For example, if the UE is before receiving a dedicated higher layer parameter from the base station, and if there are DL PLs or RSRPs measured based on RSs and/or synchronization sequences associated with a plurality of Uu SSBs, the UE may consider a DL PL value related to an average value of the plurality of values as DLPL_SLPW. For example, the average value may be a weight average value. For example, the UE may be a UE within a coverage of the base station.

Or, for example, if the UE is in an RRC_IDLE state, the UE may consider a DL PL measured based on an RS (e.g., PBCH DMRS) related to a Uu SSB used for deriving MIB information as DLPL_SLPW. For example, if the UE is in an RRC_IDLE state, the UE may consider a DL PL measured based on an RS and/or a synchronization sequence (e.g., SSS) related to a Uu SSB used for deriving MIB information and/or SIB information related to SL communication as DLPL_SLPW. For example, if the UE is in an RRC_IDLE state, the UE may consider a DL PL measured based on an RS and/or a synchronization sequence (e.g., SSS) related to a Uu SSB used for deriving MIB information and/or SIB information related to Uu communication as DLPL_SLPW. For example, if the UE is in an RRC_IDLE state, and if there are DL PLs or RSRPs measured based on RSs and/or synchronization sequences associated with a plurality of Uu SSBs, the UE may consider a DL PL value related to a maximum value among the plurality of values as DLPL_SLPW. For example, if the UE is in an RRC_IDLE state, and if there are DL PLs or RSRPs measured based on RSs and/or synchronization sequences associated with a plurality of Uu SSBs, the UE may consider a DL PL value related to a minimum value among the plurality of values as DLPL_SLPW. For example, if the UE is in an RRC_IDLE state, and if there are DL PLs or RSRPs measured based on RSs and/or synchronization sequences associated with a plurality of Uu SSBs, the UE may consider a DL PL value related to an average value of the plurality of values as DLPL_SLPW. For example, the average value may be a weight average value. For example, the UE may be a UE within a coverage of the base station.

For example, the case in which the UE is in the RRC_IDLE state may include a case in which the UE is not configured to monitor the DCI format 0_0. Referring to Table 5 above, for example, the DCI format 0_0 may be a DCI format for scheduling the PUSCH in one cell. For example, if the UE is not configured to monitor the downlink control information (DCI) format 0_0, the UE may consider a DL PL measured based on an RS (e.g., PBCH DMRS) related to a Uu SSB used for deriving MIB information as DLPL_SLPW. For example, if the UE is not configured to monitor the DCI format 0_0, the UE may consider a DL PL measured based on an RS and/or a synchronization sequence (e.g., SSS) related to a Uu SSB used for deriving MIB information and/or SIB information related to SL communication as DLPL_SLPW. For example, if the UE is not configured to monitor the DCI format 0_0, the UE may consider a DL PL measured based on an RS and/or a synchronization sequence (e.g., SSS) related to a Uu SSB used for deriving MIB information and/or SIB information related to Uu communication as DLPL_SLPW. For example, if the UE is not configured to monitor the DCI format 0_0, and if there are DL PLs or RSRPs measured based on RSs and/or synchronization sequences associated with a plurality of Uu SSBs, the UE may consider a DL PL value related to a maximum value among the plurality of values as DLPL_SLPW. For example, if the UE is not configured to monitor the DCI format 0_0, and if there are DL PLs or RSRPs measured based on RSs and/or synchronization sequences associated with a plurality of Uu SSBs, the UE may consider a DL PL value related to a minimum value among the plurality of values as DLPL_SLPW. For example, if the UE is not configured to monitor the DCI format 0_0, and if there are DL PLs or RSRPs measured based on RSs and/or synchronization sequences associated with a plurality of Uu SSBs, the UE may consider a DL PL value related to an average value of the plurality of values as DLPL_SLPW. For example, the average value may be a weight average value. For example, the UE may be a UE within a coverage of the base station.

Based on an embodiment of the present disclosure, if the UE does not correspond to the above-described condition A, the UE may consider a DL PL used for determining transmit power related to DCI format/type-based Uu channel/signal (e.g., PUSCH) as DLPL_SLPW. For example, a case in which the UE does not correspond to the above-described condition A may include at least one of a case in which the UE receives RS information related to DLPL_SLPW from the base station, a case in which the UE receives RS information related to a pre-configured UU channel/signal (e.g., PUSCH) referenced for deriving DLPL_SLPW, a case in which the UE receives a dedicated higher layer parameter from the base station, or a case in which the UE is in an RRC connected state. Herein, for example, the case in which the UE is in the RRC connected state may include a case in which the UE is configured to monitor the DCI format 0_0.

For example, if the UE does not correspond to the above-described condition A, the UE may use a DL PL used for determining transmit power related to a Uu channel/signal (e.g., PUSCH) scheduled by non-fallback DCI (e.g., DCI format 0_1, DCI format 0_2) as DLPL_SLPW. Herein, for example, an SRS resource indicator (SRI) field (e.g., for informing/indicating index information of a Uu RS resource from which the DL PL used for determining transmit power related to the PUSCH is derived) may be defined in DCI format 3_0. For example, in this case, the UE may use a DL PL derived based on the index of the Uu RS resource indicated by the SRI field as DLPL_SLPW. Or, for example, if the UE does not correspond to the above-described condition A, the UE may use a DL PL used for determining transmit power related to a Uu channel/signal (e.g., PUSCH) scheduled by fallback DCI (e.g., DCI format 0_0) as DLPL_SLPW. For example, in the case of MODE 1 CG, the UE may use a DL PL derived based on an RS indicated by a CG-related parameter (e.g., CONFIGUREDGRANTCONFIG) as DLPL_SLPW. Herein, for example, according to a parameter setting from the base station, the UE may use a DL PL derived based on an index of a Uu RS resource provided by a PUCCH-related parameter (e.g., PUCCH-SPATIALRELATIONINFO) as DLPL_SLPW. For example, if the PUCCH-related parameter (e.g., PUCCH-SPATIALRELATIONINFO) is configured/present for an active UL BWP, the UE may consider a DL PL derived based on an RS related to PUCCH-SPATIALRELATIONINFO for a PUCCH resource with the lowest index as DLPL_SLPW. That is, for example, the UE may reuse the operation of fallback DCI. For example, the UE may use a DL PL derived based on an index of a Uu RS resource provided by a PUSCH-related parameter (e.g., PUSCH-PATHLOSSREFERENCERS-ID=0) as DLPL_SLPW. For example, the UE may consider a DL PL derived based on an RS with respect to a case in which a PUSCH-PATHLOSSREFERENCERS-ID value is 0 as DLPL_SLPW. For example, the UE may reuse the operation of fallback DCI when there is no spatial setting for a PUCCH or the operation of non-fallback DCI without an SRI. For example, the UE may use a DL PL derived based on an index of a Uu RS resource provided by a transmission configuration indication (TCI) related to CORESET with the lowest index on an active DL BWP as DLPL_SLPW. For example, the UE may consider a DL PL derived based on an RS associated with a TCI for CORESET with the lowest index on an active DL BWP of a scheduling cell as DLPL_SLPW. For example, it may be a case in which there is no spatial setting for a PUCCH in fallback DCI and a specific parameter (e.g., ENABLEDEFAULTBEAMP1FORPUSCH0_0) is given. For example, the spatial setting may be a spatial relation setting.

For example, if the UE is in an RRC connected state, the UE may use a DL PL used for determining transmit power related to a Uu channel/signal (e.g., PUSCH) scheduled by non-fallback DCI (e.g., DCI format 0_1, DCI format 0_2) as DLPL_SLPW. Herein, for example, an SRS resource indicator (SRI) field (e.g., for informing/indicating index information of a Uu RS resource from which the DL PL used for determining transmit power related to the PUSCH is derived) may be defined in DCI format 3_0. For example, in this case, the UE may use a DL PL derived based on the index of the Uu RS resource indicated by the SRI field as DLPL_SLPW. Or, for example, if the UE is in an RRC connected state, the UE may use a DL PL used for determining transmit power related to a Uu channel/signal (e.g., PUSCH) scheduled by fallback DCI (e.g., DCI format 0_0) as DLPL_SLPW. For example, in the case of MODE 1 CG, the UE may use a DL PL derived based on an RS indicated by CONFIGUREDGRANTCONFIG as DLPL_SLPW. Herein, for example, according to a parameter setting from the base station, the UE may use a DL PL derived based on an index of a Uu RS resource provided by PUCCH-SPATIALRELATIONINFO as DLPL_SLPW. For example, if PUCCH-SPATIALRELATIONINFO is configured/present for an active UL BWP, the UE may consider a DL PL derived based on an RS related to PUCCH-SPATIALRELATIONINFO for a PUCCH resource with the lowest index as DLPL_SLPW. That is, for example, the UE may reuse the operation of fallback DCI. For example, the UE may use a DL PL derived based on an index of a Uu RS resource provided by PUSCH-PATHLOSSREFERENCERS-ID=0 as DLPL_SLPW. For example, the UE may consider a DL PL derived based on an RS with respect to a case in which a PUSCH-PATHLOSSREFERENCERS-ID value is 0 as DLPL_SLPW. For example, the UE may reuse the operation of fallback DCI when there is no spatial setting for a PUCCH or the operation of non-fallback DCI without an SRI. For example, the UE may use a DL PL derived based on an index of a Uu RS resource provided by a transmission configuration indication (TCI) related to CORESET with the lowest index on an active DL BWP as DLPL_SLPW. For example, the UE may consider a DL PL derived based on an RS associated with a TCI for CORESET with the lowest index on an active DL BWP of a scheduling cell as DLPL_SLPW. For example, it may be a case in which there is no spatial setting for a PUCCH in fallback DCI and ENABLEDEFAULTBEAMP1FORPUSCH0_0 is given.

For example, if the UE is configured to monitor non-fallback DCI, the UE may use a DL PL used for determining transmit power related to a Uu channel/signal (e.g., PUSCH) scheduled by non-fallback DCI (e.g., DCI format 0_1, DCI format 0_2) as DLPL_SLPW. Herein, for example, an SRS resource indicator (SRI) field (e.g., for informing/indicating index information of a Uu RS resource from which the DL PL used for determining transmit power related to the PUSCH is derived) may be defined in DCI format 3_0. For example, in this case, the UE may use a DL PL derived based on the index of the Uu RS resource indicated by the SRI field as DLPL_SLPW.

Or, for example, if the UE is configured to monitor the DCI format 0_0, the UE may use a DL PL used for determining transmit power related to a Uu channel/signal (e.g., PUSCH) scheduled by the DCI format 0_0 as DLPL_SLPW. For example, in the case of MODE 1 CG, the UE may use a DL PL derived based on an RS indicated by CONFIGUREDGRANTCONFIG as DLPL_SLPW. Herein, for example, according to a parameter setting from the base station, the UE may use a DL PL derived based on an index of a Uu RS resource provided by PUCCH-SPATIALRELATIONINFO as DLPL_SLPW. For example, if PUCCH-SPATIALRELATIONINFO is configured/present for an active UL BWP, the UE may consider a DL PL derived based on an RS related to PUCCH-SPATIALRELATIONINFO for a PUCCH resource with the lowest index as DLPL_SLPW. That is, for example, the UE may reuse the operation of fallback DCI. For example, the UE may use a DL PL derived based on an index of a Uu RS resource provided by PUSCH-PATHLOSSREFERENCERS-ID=0 as DLPL_SLPW. For example, the UE may consider a DL PL derived based on an RS with respect to a case in which a PUSCH-PATHLOSSREFERENCERS-ID value is 0 as DLPL_SLPW. For example, the UE may reuse the operation of fallback DCI when there is no spatial setting for a PUCCH or the operation of non-fallback DCI without an SRI. For example, the UE may use a DL PL derived based on an index of a Uu RS resource provided by a transmission configuration indication (TCI) related to CORESET with the lowest index on an active DL BWP as DLPL_SLPW. For example, the UE may consider a DL PL derived based on an RS associated with a TCI for CORESET with the lowest index on an active DL BWP of a scheduling cell as DLPL_SLPW. For example, it may be a case in which there is no spatial setting for a PUCCH in fallback DCI and ENABLEDEFAULTBEAMP1FORPUSCH0_0 is given.

Based on an embodiment of the present disclosure, the UE may report RS/sequence information for deriving DLPL_SLPW for determining power related to SL transmission through pre-configured signaling (e.g., PUCCH, PUSCH) to the base station. For example, the UE may report RS/sequence information for deriving DLPL_SLPW for determining power related to SL transmission through a pre-configured information format (e.g., MAC CE, UCI) to the base station. Herein, for example, the RS/sequence information may include at least one of RS/sequence information preferred by the UE, RS/sequence information used by the UE, an RS/sequence that satisfies a pre-configured condition, or RS/sequence information that satisfies a condition pre-configured from the base station. For example, the RS/sequence information may include an index of a Uu channel/signal (e.g., SSB index) related to a resource index. Herein, for example, the RS/sequence information that satisfies the pre-configured condition may be RS/sequence information in which the lowest PL value and/or the lowest RSRP value is measured. For example, the RS/sequence information that satisfies the pre-configured condition may be RS/sequence information in which a PL value lower than a pre-configured threshold value and/or an RSRP value lower than a pre-configured threshold value is measured. Or, for example, the RS/sequence information that satisfies the pre-configured condition may be RS/sequence information in which the highest PL value and/or the lowest RSRP value is measured. For example, the RS/sequence information that satisfies the pre-configured condition may be RS/sequence information in which a PL value higher than a pre-configured threshold value and/or an RSRP value higher than a pre-configured threshold value is measured. Herein, for example, the PL value may be an average PL value. Or, for example, the RS/sequence information that satisfies the pre-configured condition may be RS/sequence information in which a DL PL used for determining power related to the most recently performed UL channel/signaling (e.g., PUSCH) transmission is measured. For example, the RS/sequence information that satisfies the pre-configured condition may be RS/sequence information in which a DL PL used for determining power related to the most recently performed UL channel/signaling (e.g., PUSCH) transmission is measured. For example, the RS/sequence information that satisfies the pre-configured condition may be RS/sequence information in which a DL PL and/or an RSRP used for determining power related to UL channel/signal (e.g., PUSCH) transmission performed within a pre-configured time window (hereinafter, PATS_TWIN) is measured. Herein, for example, the DL PL and/or the RSRP may be the highest value. Or, for example, the DL PL and/or the RSRP may be the lowest value. Also, for example, the UE may report information regarding DL PL/RSRP used for determining power related to UL channel/signal (e.g., PUSCH) transmission performed within PAST_TWIN through pre-configured signaling to the base station. For example, the UE may report information regarding DL PL/RSRP used for determining power related to UL channel/signal (e.g., PUSCH) transmission performed within PAST_TWIN through a pre-configured information format to the base station. Herein, for example, the information regarding DL PL/RSRP may include at least one of average value information regarding DL PL/RSRP, maximum value information regarding DL PL/RSRP, and minimum value information regarding DL PL/RSRP.

Based on an embodiment of the present disclosure, the UE may consider all UL/SL TX (e.g., UL SLOT I1, UL SLOT I1+1, SL SLOT I2−1, SL SLOT I2, SL SLOT I2+1) overlapping in a time domain at the same time, and the UE may determine whether to skip transmission of TX overlapping TX with the highest priority according to a pre-configured UL/SL prioritization rule. Also, for example, the UE may repeat the above process for the remaining TX. For example, the remaining TX may include at least one of TX to which the above process is not applied/checked or TX for which transmission is not skipped.

Based on an embodiment of the present disclosure, when the UE transmits SL HARQ feedback information to the base station through a PUCCH, the number of bits (hereinafter, SLUCI_NUM) used for determining a power offset value (hereinafter, SLPC_OFFVAL) related to PUCCH transmission may be assumed/defined according to the following embodiment. For example, SLUCI_NUM may be the number of bits for available SL HARQ feedback. For example, as SLUCI_NUM increases, a value of SLPC_OFFVAL may increase based on a pre-configured formula.

Based on an embodiment, if the TX UE does not perform PSSCH/PSCCH transmission because there is no data to transmit, when counting SLUCI_NUM, the UE may not reflect at least one of ACK information/bits reported through a PUCCH, NACK information/bits reported through a PUCCH in order for an additional retransmission resource request related to blind retransmission (e.g., HARQ feedback disabled MAC PDU/TB), ACK information/bits reported through a PUCCH when additional retransmission resource(s) related to blind retransmission is no longer needed, NACK information/bits that the TX UE reports through a PUCCH by dropping all PSSCH/PSCCH transmissions related to a specific TB according to a pre-configured prioritization rule, HARQ information/bits related to a case in which actual SL MAC PDU/TB transmission is not performed, HARQ information/bits related to SL MAC PDU/TB for which transmission is skipped (e.g., when applying a semi-static HARQ codebook), HARQ information/bits related to CG, or HARQ information/bits related to DG. For example, the UE may apply/calculate SLPC_OFFVAL based on different increment types/parameters pre-configured for the above-described information/bits.

Based on an embodiment, the UE may apply/calculate SLPC_OFFVAL based on increment types/parameters pre-configured differently for DG and CG. For example, the UE may apply/calculate SLPC_OFFVAL based on increment types/parameters pre-configured independently for DG and CG.

Based on an embodiment, the UE may apply/calculate SLPC_OFFVAL based on increment types/parameters pre-configured differently between a case in which NR SL is scheduled by LTE Uu and a case in which NR SL is scheduled by NR Uu. For example, the UE may apply/calculate SLPC_OFFVAL based on increment types/parameters pre-configured independently between a case in which NR SL is scheduled by LTE Uu and a case in which NR SL is scheduled by NR Uu. For example, NR SL may be NR mode 1 SL.

Based on an embodiment of the present disclosure, if one UL TX and a plurality of SL TXs overlap in a time domain, the UE may determine a channel/signal of which transmission is skipped according to the following embodiment. Or, for example, if one SL TX and a plurality of UL TXs overlap in a time domain, the UE may determine a channel/signal of which transmission is skipped according to the following embodiment. For example, the situation in which transmission of the channel/signal is skipped may be a situation in which UL TX and SL TX are performed on the same carrier.

For example, for UL TX and SL TX having LCH priorities, the MAC layer may preferentially determine a channel/signal of which transmission is skipped based on a pre-configured UL/SL prioritization rule. After that, for the remaining UL TX and SL TX of which transmission is not skipped, the PHY layer may determine a channel/signal of which transmission is skipped based on a pre-configured UL/SL prioritization rule. For example, the remaining UL TX and SL TX of which transmission is not skipped may not have LCH priority. For example, the pre-configured UL/SL prioritization rule of the MAC layer and the pre-configured UL/SL prioritization rule of the PHY layer may be different.

Additionally, the UE may consider a pathloss to determine transmit power of a S-SS/PSBCH block. For example, the UE may determine the pathloss based on an RS resource. For example, the RS resource may be a resource used by the UE to determine power of PUSCH transmission scheduled by the DCI format 0_0 if the UE is configured to monitor a PDCCH for detection of the DCI format 0_0. Or, for example, the RS resource may be a resource corresponding to a SS/PBCH block used by the UE to obtain MIB if the UE is not configured to monitor a PDCCH for detection of the DCI format 0_0.

Additionally, the UE may consider a pathloss to determine transmit power of a PSSCH. For example, the UE may determine the pathloss based on an RS resource. For example, the RS resource may be a resource used by the UE to determine power of PUSCH transmission scheduled by the DCI format 0_0 if the UE is configured to monitor a PDCCH for detection of the DCI format 0_0. Or, for example, the RS resource may be a resource corresponding to a SS/PBCH block used by the UE to obtain MIB if the UE is not configured to monitor a PDCCH for detection of the DCI format 0_0.

Additionally, for example, the UE may determine transmit power of a PSCCH based on the determined transmit power of the PSSCH.

Additionally, the UE may consider a pathloss to determine transmit power of a PSFCH. For example, the UE may determine the pathloss based on an RS resource. For example, the RS resource may be a resource used by the UE to determine power of PUSCH transmission scheduled by the DCI format 0_0 if the UE is configured to monitor a PDCCH for detection of the DCI format 0_0. Or, for example, the RS resource may be a resource corresponding to a SS/PBCH block used by the UE to obtain MIB if the UE is not configured to monitor a PDCCH for detection of the DCI format 0_0.

Figure 11:
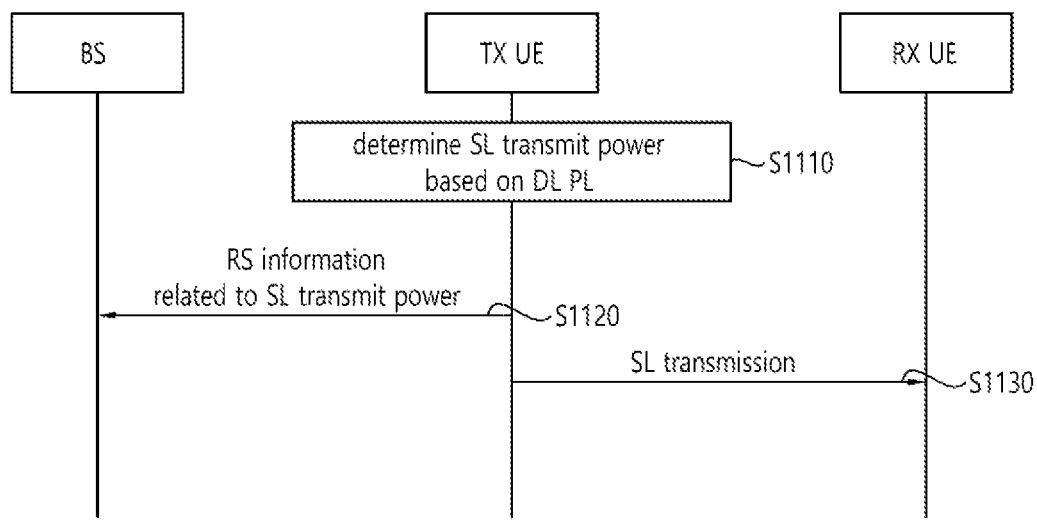
FIG. 11 shows a procedure in which a transmitting UE determines power related to SL transmission and performs SL transmission based on the determined power, based on an embodiment of the present disclosure.
Figure 12:
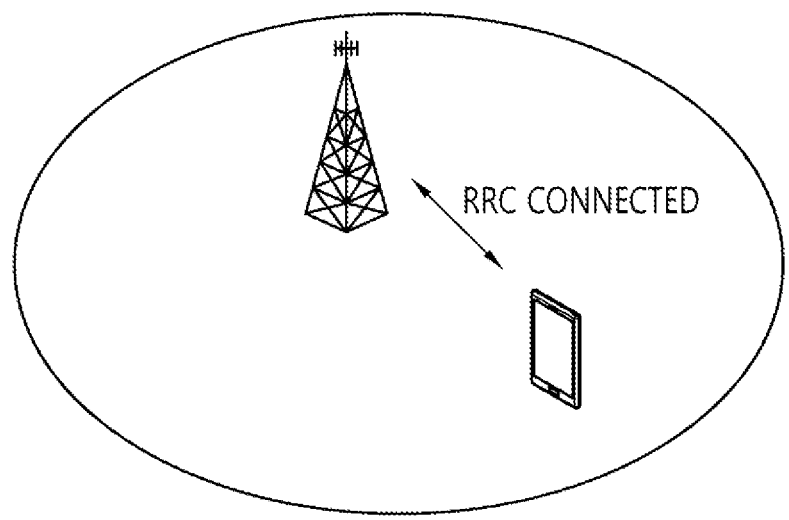
FIG. 12 shows a state of a UE based on an embodiment of the present disclosure.
Figure 12:
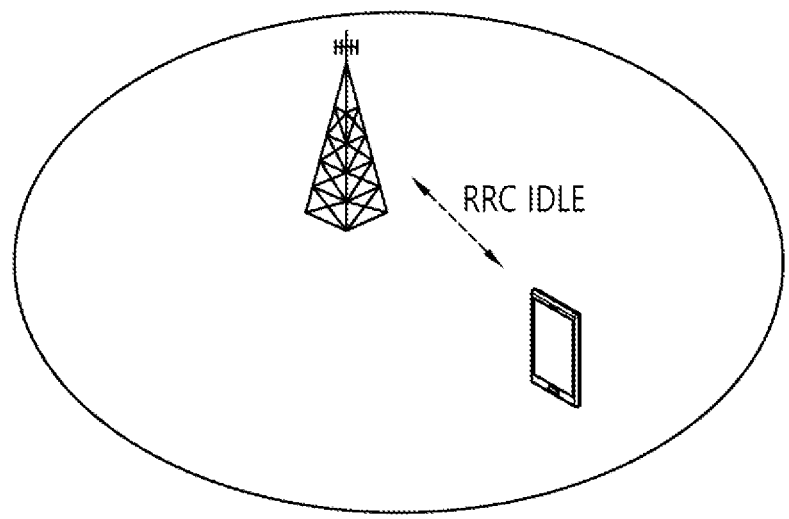
Figure 13:
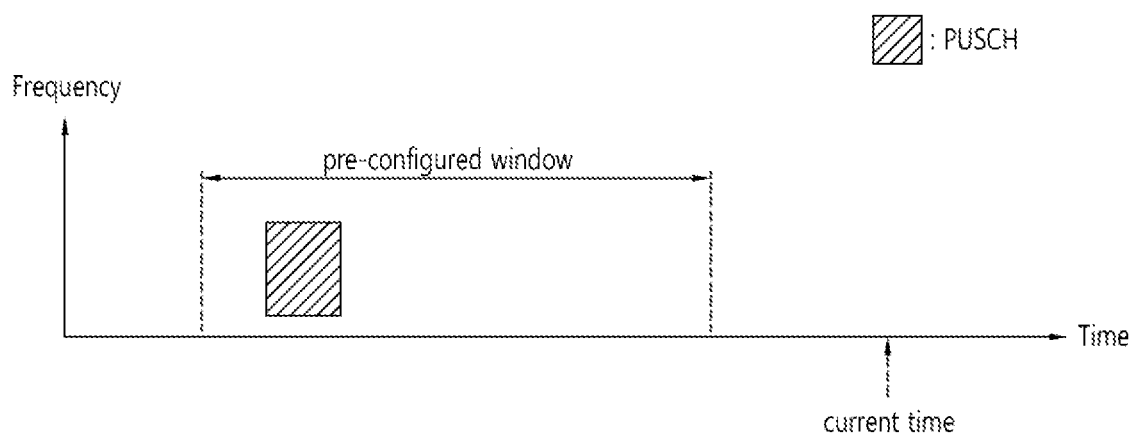
FIG. 13 shows a PUSCH within a window pre-configured by a UE, based on an embodiment of the present disclosure.

FIG. 11 shows a procedure in which a transmitting UE determines power related to SL transmission and performs SL transmission based on the determined power, based on an embodiment of the present disclosure. FIG. 12 shows a state of a UE based on an embodiment of the present disclosure. FIG. 13 shows a PUSCH within a window pre-configured by a UE, based on an embodiment of the present disclosure. The embodiments of FIGS. 11 to 13 may be combined with various embodiments of the present disclosure.

Referring to FIG. 11, in step S1110, the transmitting UE may determine SL transmit power based on a downlink pathloss (hereinafter, DL PL). For example, SL transmission may include at least one of S-SS/PSBCH block transmission, PSCCH transmission, PSSCH transmission, or PSFCH transmission.

For example, the SL transmit power may be determined differently based on at least one of a priority of a service, a type of a service, a quality of service (QoS) requirement, a resource pool congestion level, a cast type, a HARQ feedback scheme, a SL operation mode, whether the HARQ feedback is enabled, the number of SL sessions, a capability of a UE, a PSFCH resource period, the number of SL HARQ feedback bits transmitted through a physical uplink control channel (PUCCH), the number of PSFCH slots associated with a PUCCH, the number of PSFCHs required to configure PUCCH information, the number of symbols related to a SL slot in a resource pool, information related to a PSSCH demodulation reference signal (DM-RS), information related to whether SL channel state information (CSI)-RS is configured, information related to whether PT-RS is configured, information related to synchronization difference between UU communication and SL communication, a HARQ codebook type related to a PUCCH, the number of PUSCH symbols to which a PUCCH is piggybacked, a mode 1 dynamic grant, a configured grant, a SL numerology or an uplink numerology.

In step S1120, the transmitting UE may transmit RS information related to SL transmit power to the base station. For example, the transmitting UE may transmit the RS information related to SL transmit power to the base station through pre-configured signaling. For example, the transmitting UE may transmit the RS information related to SL transmit power to the base station through a pre-configured information format. For example, the pre-configured signaling may include at least one of a PUCCH and a PUSCH. For example, the pre-configured information format may include at least one of a MAC CE and UCI. For example, the RS information may be RS information that satisfies a pre-configured condition. For example, the RS information may include at least one of information regarding an RS for which a pathloss value lower than a pre-configured threshold is measured, information regarding an RS for which an RSRP value higher than a pre-configured threshold is measured, or information regarding an RS for which a pathloss is measured for determining power related to transmission of an uplink channel performed within a pre-configured time window. For example, the RS information may include at least one of information regarding an RS for which a pathloss value higher than a pre-configured threshold is measured, information regarding an RS for which an RSRP value lower than a pre-configured threshold is measured, or information regarding an RS for which a pathloss is measured for determining power related to transmission of an uplink channel performed within a pre-configured time window. For example, the RS information may include an index of a Uu channel/signal (e.g., SSB index) related to a resource index. For example, the RS information may include information regarding a sequence.

Referring to FIG. 13, for example, the transmitting UE may transmit information regarding the RS for which a pathloss is measured for determining power related to the most recently performed uplink channel transmission within a pre-configured time window to the base station. have. For example, measurement information regarding the RS may include an RS for which the highest DL PL is measured. For example, measurement information regarding the RS may include an RS for which the lowest DL PL is measured. For example, the transmitting UE may transmit information regarding DL PL and/or RSRP used for determining power related to uplink channel transmission most recently performed within a pre-configured time window to the base station. For example, the uplink channel may be a PUSCH. For example, the pre-configured time window may be a time window before the current time of the transmitting UE. For example, the transmitting UE may transmit, to the base station through pre-configured signaling, information regarding the RS for which the pathloss is measured for determining power related to transmission of the uplink channel performed within the pre-configured time window and information regarding DL PL and/or RSRP used for determining power related to uplink channel transmission performed within the pre-configured time window. For example, the information regarding DL PL and/or RSRP may include an average value of DL PLs and/or an average value of RSRPs. For example, the information regarding DL PL and/or RSRP may include a maximum value of DL PLs and/or a maximum value of RSRPs. For example, the information regarding DL PL and/or RSRP may include a minimum value of DL PLs and/or a minimum value of RSRPs.

Additionally, for example, the above-described step S1120 may be performed before step S1110 or after step S1130.

In step S1130, the transmitting UE may perform SL transmission to the receiving UE based on the determined SL transmit power. For example, based on being configured to monitor the DCI format 0_0, the transmitting UE may determine the downlink pathloss based on a first RS used for power control related to PUSCH transmission scheduled by the DCI format 0_0. For example, the first RS may be an RS based on a parameter configured by the base station. For example, the first RS may be an RS based on a parameter for a PUCCH resource of the lowest index on an active uplink BWP. For example, the parameter configured by the base station may include ID information of a reference RS for a pathloss related to a PUSCH. For example, the first RS may be an RS based on an ID value of 0 of a reference RS for a pathloss related to a PUSCH. For example, based on not being configured to monitor the DCI format 0_0, the transmitting UE may determine the downlink pathloss based on a second RS related to a synchronization signal block (SSB) for obtaining MIB. For example, the SSB may include a physical broadcast channel (PBCH), a primary synchronization signal (PSS), and a secondary synchronization signal (SSS). For example, the second RS may be a PBCH demodulation-reference signal (DM-RS) or an SSS.

Referring to FIG. 12, for example, monitoring for the DCI format 0_0 may be performed based on that the first device is in an RRC_CONNECTED state. That is, for example, if the transmitting UE is located within a coverage of the base station and in the RRC_CONNECTED state, the transmitting UE may be configured to monitor the DCI format 0_0. Or, for example, monitoring for the DCI format 0_0 may not be performed based on that the first device is in an RRC_IDLE state. That is, for example, if the transmitting UE is located within a coverage of the base station and in the RRC_IDLE state, the transmitting UE may be configured not to perform monitoring for the DCI format 0_0.

For example, based on that the transmitting UE is configured to monitor the DCI format 0_1 or the DCI format 0_2, the DCI format 3_0 may include a sounding reference signal resource indicator (SRI) field. For example, the SRI field may include RS information for determining transmit power related to PUSCH transmission. For example, the transmitting UE may determine the downlink pathloss based on a third RS related to the SRI field.

Figure 14:
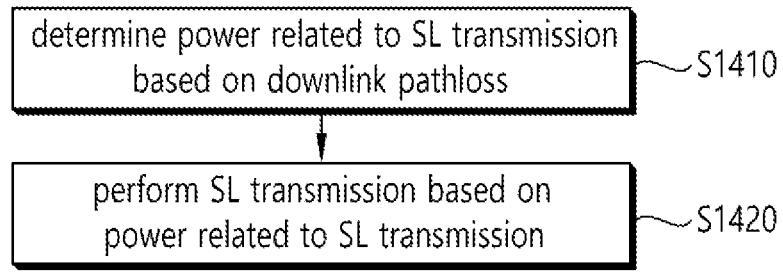
FIG. 14 shows a method for a first device to perform SL transmission based on power related to SL transmission, based on an embodiment of the present disclosure.

FIG. 14 shows a method for a first device to perform SL transmission based on power related to SL transmission, based on an embodiment of the present disclosure. The embodiment of FIG. 14 may be combined with various embodiments of the present disclosure.

Referring to FIG. 14, in step S1410, the first device 100 may determine power related to SL transmission based on a downlink pathloss. For example, the SL transmission may include at least one of S-SS/PSBCH block transmission, PSCCH transmission, PSSCH transmission, or PSFCH transmission.

In step S1420, the first device 100 may perform the SL transmission based on the power related to the SL transmission. For example, based on being configured to monitor the DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to an SSB for obtaining a MIB. For example, the SSB may include a PBCH, a PSS and an SSS. For example, monitoring for the DCI format 0_0 may be performed based on that the first device 100 is in an RRC_CONNECTED state. For example, monitoring for the DCI format 0_0 may not be performed based on that the first device 100 is in an RRC_IDLE state.

For example, the first RS may be an RS based on a parameter configured by the base station. For example, the first RS may be an RS based on a parameter for a physical uplink control channel (PUCCH) resource with the lowest index on an active uplink bandwidth part (BWP). For example, the parameter configured by the base station may include ID information of a reference RS for a pathloss related to a PUSCH. For example, the first RS may be an RS based on that an ID value of the reference RS for the pathloss related to the PUSCH is 0. For example, the first RS may be an RS based on a transmission configuration indication (TCI) related to a control resource set (CORESET) with the lowest index on an active downlink BWP.

For example, the second RS may be a PBCH demodulation-reference signal (DM-RS) or an SSS.

For example, the DCI format 3_0 may include a sounding reference signal resource indicator (SRI) field, based on being configured to monitor the DCI format 0_1 or the DCI format 0_2. For example, the SRI field may include RS information for determining transmit power related to PUSCH transmission. For example, the downlink pathloss may be determined based on a third RS related to the SRI field.

For example, the power related to the SL transmission may be determined differently based on a period of a PSFCH resource. For example, the power related to the SL transmission may be determined differently based on at least one of a service priority, a service type, a quality of service (QoS) requirement, a resource pool congestion level, a cast type, a HARQ feedback scheme, a SL operation mode, whether or not HARQ feedback is enabled, the number of SL sessions, a UE capability, a period of a PSFCH resource, the number of SL HARQ feedback bits transmitted through a physical uplink control channel (PUCCH), the number of PSFCH slots associated with a PUCCH, the number of PSFCHs required to configure PUCCH information, the number of symbols related to a SL slot in a resource pool, information related to PSSCH demodulation reference signal (DM-RS), information related to whether SL channel state information (CSI)-RS is configured, information related to whether PT-RS is configured, information related to synchronization difference between SL communication and UU communication, a HARQ codebook type related to a PUCCH, the number of PUSCH symbols to which a PUCCH is piggybacked, a mode 1 dynamic grant, a configured grant, a SL numerology or uplink numerology.

For example, the first device 100 may transmit information regarding an RS for determining the power related to the SL transmission to the base station through pre-configured signaling. Herein, for example, the information regarding the RS may include at least one of information regarding an RS for which a pathloss value lower than a pre-configured threshold is measured, information regarding an RS for which an RSRP value higher than a pre-configured threshold is measured, or information regarding an RS for which a pathloss is measured for determining power related to transmission of an uplink channel performed within a pre-configured time window.

The above-described embodiment can be applied to various device(s) to be described below. For example, the processor 102 of the first device 100 may determine the power related to the SL transmission based on the downlink pathloss. In addition, the processor 102 of the first device 100 may control the transceiver 106 to perform the SL transmission based on the power related to the SL transmission.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: determine power related to SL transmission based on a downlink pathloss, wherein the SL transmission includes at least one of S-SS/PSBCH block transmission, PSCCH transmission, PSSCH transmission, or PSFCH transmission; and perform the SL transmission based on the power related to the SL transmission. For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB.

Based on an embodiment of the present disclosure, an apparatus adapted to control a first user equipment (UE) may be provided. For example, the apparatus may comprise: one or more processors; and one or more memories operably connected to the one or more processors and storing instructions. For example, wherein the one or more processors may execute the instructions to: determine power related to SL transmission based on a downlink pathloss, wherein the SL transmission includes at least one of S-SS/PSBCH block transmission, PSCCH transmission, PSSCH transmission, or PSFCH transmission; and perform the SL transmission based on the power related to the SL transmission. For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB.

Based on an embodiment of the present disclosure, a non-transitory computer-readable storage medium storing instructions may be provided. For example, the instructions may, when executed, cause a first device to: determine power related to SL transmission based on a downlink pathloss, wherein the SL transmission includes at least one of S-SS/PSBCH block transmission, PSCCH transmission, PSSCH transmission, or PSFCH transmission; and perform the SL transmission based on the power related to the SL transmission. For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB.

FIG. 15 shows a method for a second device to perform SL transmission with a first device, based on an embodiment of the present disclosure. The embodiment of FIG. 15 may be combined with various embodiments of the present disclosure.

Referring to FIG. 15, in step S1510, the second device 200 may perform SL communication with the first device 100 based on power related to the SL communication. For example, the power related to the SL communication may be determined by the first device 100 based on a downlink pathloss. For example, the SL communication may include at least one of S-SS/PSBCH block transmission, PSCCH transmission, PSSCH transmission, or PSFCH transmission.

For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB. For example, the SSB may include a PBCH, a PSS and an SSS. For example, monitoring for the DCI format 0_0 may be performed based on that the first device 100 is in an RRC_CONNECTED state. For example, monitoring for the DCI format 0_0 may not be performed based on that the first device 100 is in an RRC_IDLE state.

For example, the first RS may be an RS based on a parameter configured by the base station. For example, the first RS may be an RS based on a parameter for a physical uplink control channel (PUCCH) resource with the lowest index on an active uplink bandwidth part (BWP). For example, the parameter configured by the base station may include ID information of a reference RS for a pathloss related to a PUSCH. For example, the first RS may be an RS based on that an ID value of the reference RS for the pathloss related to the PUSCH is 0. For example, the first RS may be an RS based on a transmission configuration indication (TCI) related to a control resource set (CORESET) with the lowest index on an active downlink BWP.

For example, the second RS may be a PBCH demodulation-reference signal (DM-RS) or an SSS.

For example, the DCI format 3_0 may include a sounding reference signal resource indicator (SRI) field, based on being configured to monitor the DCI format 0_1 or the DCI format 0_2. For example, the SRI field may include RS information for determining transmit power related to PUSCH transmission. For example, the downlink pathloss may be determined based on a third RS related to the SRI field.

For example, the power related to the SL transmission may be determined differently based on a period of a PSFCH resource. For example, the power related to the SL transmission may be determined differently based on at least one of a service priority, a service type, a quality of service (QoS) requirement, a resource pool congestion level, a cast type, a HARQ feedback scheme, a SL operation mode, whether or not HARQ feedback is enabled, the number of SL sessions, a UE capability, a period of a PSFCH resource, the number of SL HARQ feedback bits transmitted through a physical uplink control channel (PUCCH), the number of PSFCH slots associated with a PUCCH, the number of PSFCHs required to configure PUCCH information, the number of symbols related to a SL slot in a resource pool, information related to PSSCH demodulation reference signal (DM-RS), information related to whether SL channel state information (CSI)-RS is configured, information related to whether PT-RS is configured, information related to synchronization difference between SL communication and UU communication, a HARQ codebook type related to a PUCCH, the number of PUSCH symbols to which a PUCCH is piggybacked, a mode 1 dynamic grant, a configured grant, a SL numerology or uplink numerology.

For example, information regarding an RS for determining the power related to the SL transmission may be transmitted by the first device 100 through pre-configured signaling to the base station. Herein, for example, the information regarding the RS may include at least one of information regarding an RS for which a pathloss value lower than a pre-configured threshold is measured, information regarding an RS for which an RSRP value higher than a pre-configured threshold is measured, or information regarding an RS for which a pathloss is measured for determining power related to transmission of an uplink channel performed within a pre-configured time window.

The above-described embodiment can be applied to various device(s) to be described below. For example, the processor 202 of the second device 200 may control the transceiver 206 to perform the SL communication with the first device based on the power related to sidelink (SL) communication.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: perform SL communication with a first device based on power related to the SL communication. For example, the power related to the SL transmission may be determined based on a downlink pathloss. For example, the SL transmission may include at least one of S-SS/PSBCH block transmission, PSCCH transmission, PSSCH transmission, or PSFCH transmission. For example, based on being configured to monitor a DCI format 0_0, the downlink pathloss may be determined based on a first RS used for power control related to PUSCH transmission scheduled by the DCI format 0_0. For example, based on not being configured to monitor the DCI format 0_0, the downlink pathloss may be determined based on a second RS related to a SSB for obtaining a MIB.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
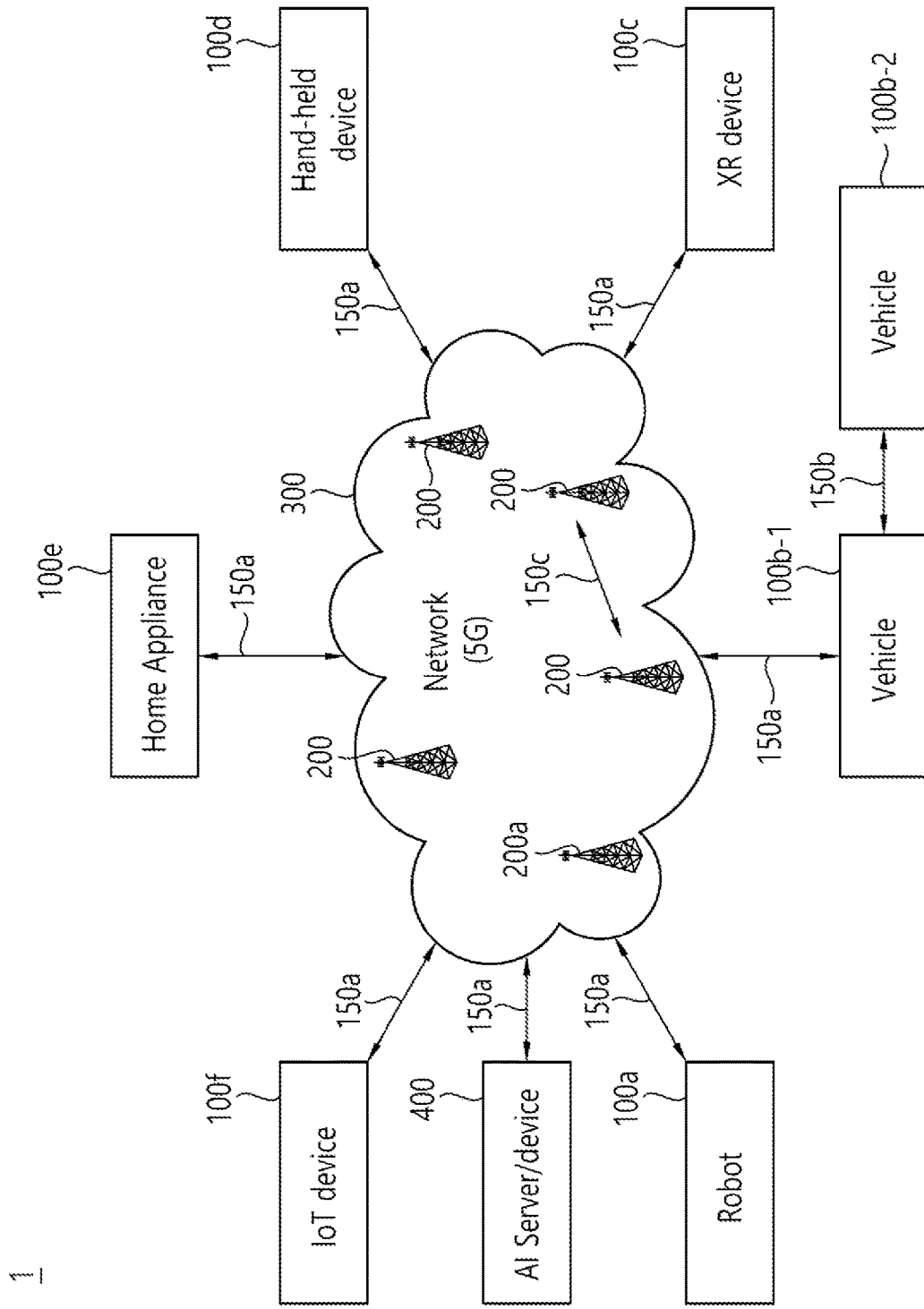
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (TAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
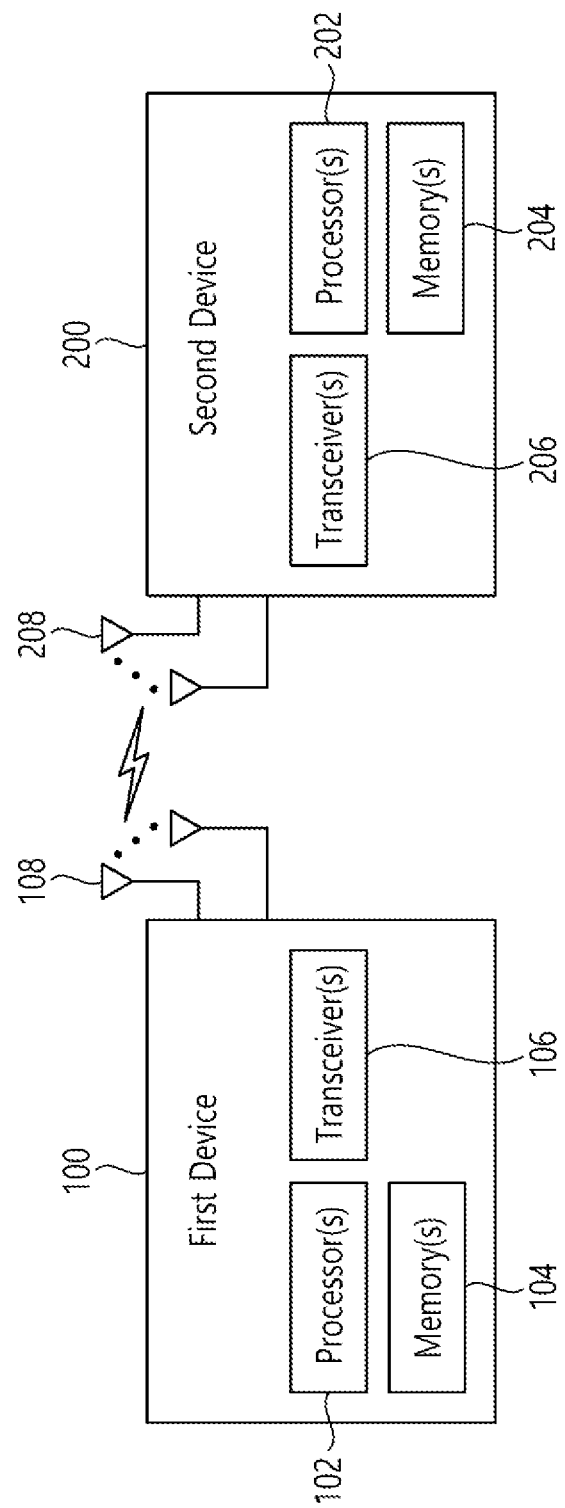
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may b e interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
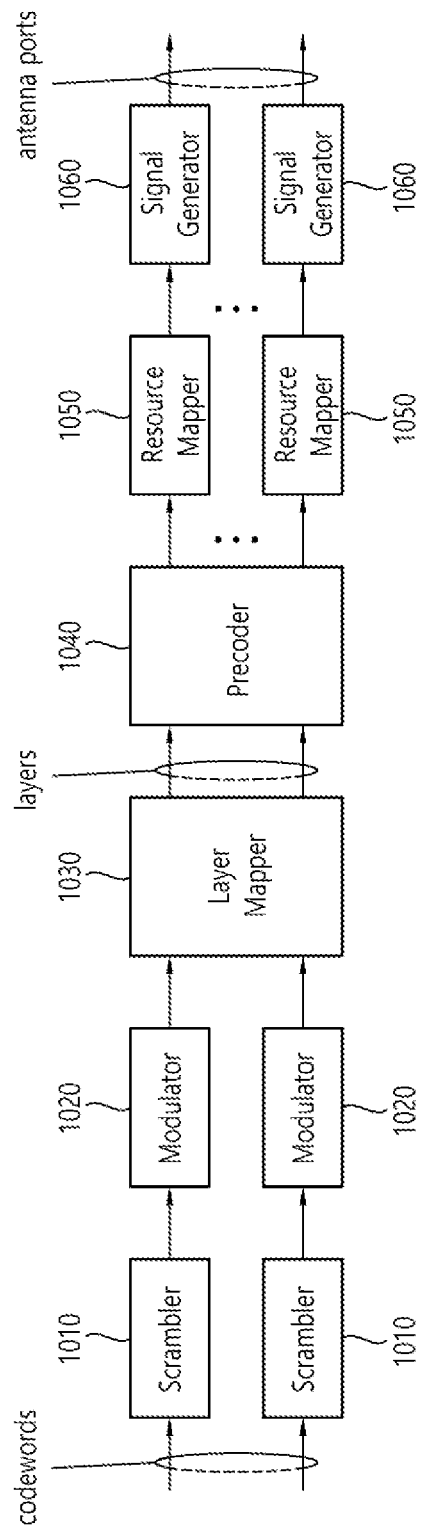
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
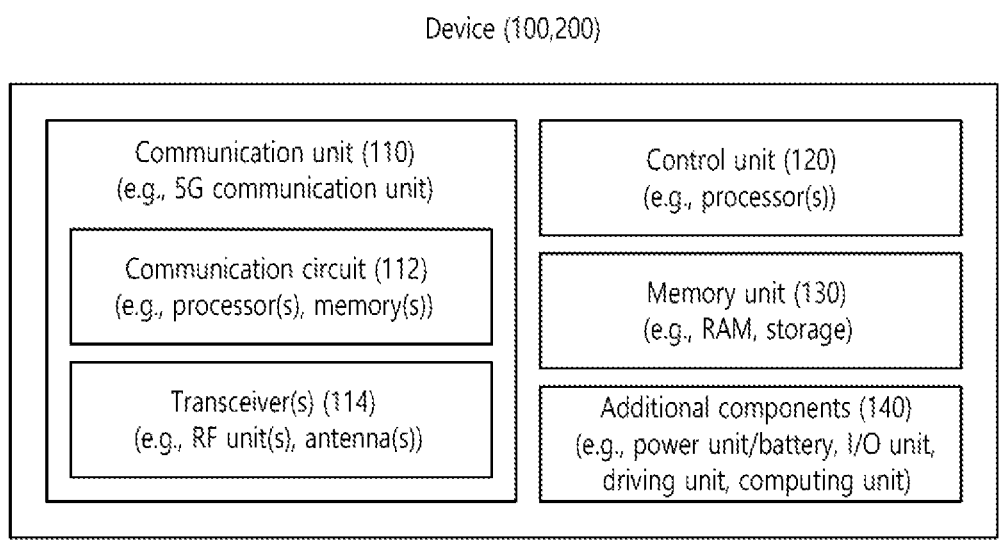
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
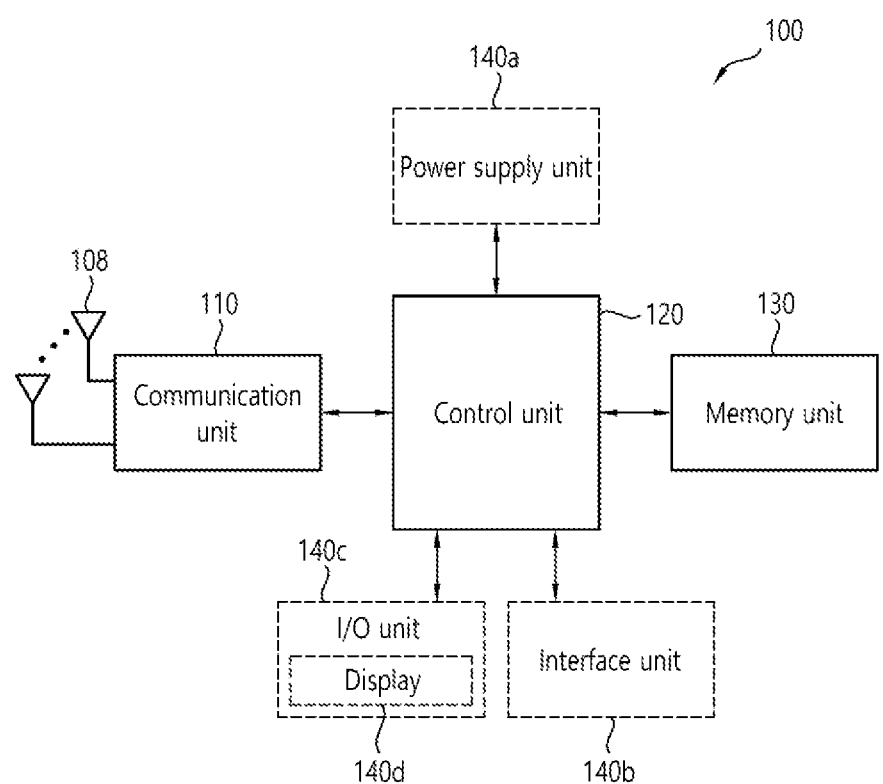
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   determining a power for a sidelink (SL) transmission based on a downlink pathloss; and
   performing the SL transmission based on the power for the SL transmission, wherein the SL transmission includes at least one of sidelink-synchronization signal/physical sidelink broadcast channel (S-SS/PSBCH) block transmission, physical sidelink control channel (PSCCH) transmission, physical sidelink shared channel (PSSCH) transmission, or physical sidelink feedback channel (PSFCH) transmission, and wherein the downlink pathloss for determining the power for the SL transmission is calculated using:
a reference signal (RS) used for determining a power of a physical uplink shared channel (PUSCH) transmission when the first device is configured to monitor a downlink control information (DCI)-format 0_0 scheduling the PUSCH transmission; and
an RS related to a synchronization signal block (SSB) used to obtain a master information block (MIB) when the first device is not configured to monitor the DCI format 0_0, and
wherein the RS used for determining the power of the PUSCH transmission comprises at least one of:
a first RS related to spatial relation information for a physical uplink control channel (PUCCH) resource with a lowest index for an active uplink (UL) bandwidth part (BWP); or
a second RS related to a transmission configuration indicator (TCI) state of a control resource set (CORESET) with a lowest index in an active downlink (DL) BWP.

2. The method of claim 1, wherein
the SSB includes a physical broadcast channel (PBCH), a primary synchronization signal (PSS) and a secondary synchronization signal (SSS), and
wherein the RS related to the SSB used to obtain the MIB is a PBCH demodulation-reference signal (DM-RS) or an SSS.

3. The method of claim 1, wherein the first device is configured to monitor the DCI format 0_0 based on the first device being in an RRC_CONNECTED state.

4. The method of claim 1, wherein the first device is configured to monitor the DCI format 0_0 based on the first device being in an RRC_IDLE state.

5. The method of claim 1, further comprising:
receiving, from a network, a DCI format 3_0 comprising a sounding reference signal resource indicator (SRI) field; and
determining a transmit power for the PUSCH transmission based on RS information related to the SRI field.

6. The method of claim 5, wherein the downlink pathloss is determined based on the RS information related to the SRI field.

7. The method of claim 1, wherein the power for the SL transmission is determined differently based on a period of a PSFCH resource.

8. The method of claim 1, further comprising:
transmitting, to a network, information regarding an RS for determining the power for the SL transmission through pre-configured signaling.

9. The method of claim 8, wherein the information comprises at least one of information regarding an RS for which a pathloss value lower than a pre-configured threshold is measured, information regarding an RS for which a reference signal received power (RSRP) value higher than a pre-configured threshold is measured, or information regarding an RS for which a pathloss is measured for determining power for transmission of an uplink channel performed within a pre-configured time window.

10. The method of claim 1, wherein the SL transmission includes the PSSCH transmission, further comprising:
transmitting, via a physical uplink control channel (PUCCH) based on a transmission power for the PUCCH, hybrid automatic repeat request (HARQ) information comprising first HARQ information bits for the PSSCH transmission that is performed and second HARQ information bits for a PSSCH transmission that is not performed,
wherein the transmission power for the PUCCH is obtained based on a number of HARQ information bits including the first HARQ information bits and excluding the second HARQ information bits.

11. A first device adapted to perform wireless communication, the first device comprising:
one or more memories storing instructions;
one or more transceivers; and
one or more processors operatively connected to the one or more memories and the one or more transceivers, wherein the instructions perform, based on being executed by the one or more processors, operations comprising:
determining a power for a sidelink (SL) transmission based on a downlink pathloss; and
performing the SL transmission based on the power for the SL transmission,
wherein the SL transmission includes at least one of sidelink-synchronization signal/physical sidelink broadcast channel (S-SS/PSBCH) block transmission, physical sidelink control channel (PSCCH) transmission, physical sidelink shared channel (PSSCH) transmission, or physical sidelink feedback channel (PSFCH) transmission, and
wherein the downlink pathloss for determining the power for the SL transmission is calculated using:
a reference signal (RS) used for determining a power of a physical uplink shared channel (PUSCH) transmission when the first device is configured to monitor a downlink control information (DCI) format 0_0 scheduling the PUSCH transmission; and
an RS related to a synchronization signal block (SSB) used to obtain a master information block (MIB) when the first device is not configured to monitor the DCI format 0_0, and
wherein the RS used for determining the power of the PUSCH transmission comprises at least one of:
a first RS related to spatial relation information for a physical uplink control channel PUCCH) resource with a lowest index for an active uplink (UL) bandwidth part (BWP); or
a second RS related to a transmission configuration indicator (TCI) state of a control resource set (CORESET) with a lowest index in an active downlink (DL) BWP.

12. The first device of claim 11,
wherein the SSB includes a physical broadcast channel (PBCH), a primary synchronization signal (PSS) and a secondary synchronization signal (SSS), and
wherein the RS related to the SSB used to obtain the MIB is a PBCH demodulation-reference signal (DM-RS) or an SSS.

13. The first device of claim 11, wherein the SL transmission includes the PSSCH transmission,
wherein the operations further comprise transmitting, via a physical uplink control channel (PUCCH) based on a transmission power for the PUCCH, hybrid automatic repeat request (HARQ) information comprising first HARQ information bits for the PSSCH transmission that is performed and second HARQ information bits for a PSSCH transmission that is not performed, and wherein the transmission power for the PUCCH is obtained based on a number of HARQ information bits including the first HARQ information bits and excluding the second HARQ information bits.

14. A processing device adapted to control a first device, the processing device comprising:
one or more processors; and
one or more memories operably connected to the one or more processors and storing instructions that, based on being executed by the one or more processors, perform operations comprising:
determining a power for a sidelink (SL) transmission based on a downlink pathloss; and
performing the SL transmission based on the power for the SL transmission,
wherein the SL transmission includes at least one of sidelink-synchronization signal/physical sidelink broadcast channel (S-SS/PSBCH) block transmission, physical sidelink control channel (PSCCH) transmission, physical sidelink shared channel (PSSCH) transmission, or physical sidelink feedback channel (PSFCH) transmission, and
wherein the downlink pathloss for determining the power for the SL transmission is calculated using:
a reference signal (RS) used for determining a power of a physical uplink shared channel (PUSCH) transmission when the first device is configured to monitor a downlink control information (DCI) format 0_0 scheduling the PUSCH transmission; and
an RS related to a synchronization signal block (SSB) used to obtain a master information block (MIB) when the first device is not configured to monitor the DCI format 0_0, and
wherein the RS used for determining the power of the PUSCH transmission comprises at least one of:
a first RS related to spatial relation information for a physical uplink control channel (PUCCH) resource with a lowest index for an active uplink (UL) bandwidth part (BWP); or
a second RS related to a transmission configuration indicator (TCI) state of a control resource set (CORESET) with a lowest index in an active downlink (DL) BWP.

15. The processing device of claim 14, wherein the SL transmission includes the PSSCH transmission,
wherein the operations further comprise transmitting, via a physical uplink control channel (PUCCH) based on a transmission power for the PUCCH, hybrid automatic repeat request (HARQ) information comprising first HARQ information bits for the PSSCH transmission that is performed and second HARQ information bits for a PSSCH transmission that is not performed, and
wherein the transmission power for the PUCCH is obtained based on a number of HARQ information bits including the first HARQ information bits and excluding the second HARQ information bits.

* * * * *